United States Patent
Tani et al.

(10) Patent No.: US 6,587,527 B1
(45) Date of Patent: Jul. 1, 2003

(54) FRAME SYNCHRONISM PROCESSING APPARATUS AND FRAME SYNCHRONISM PROCESSING METHOD

(75) Inventors: Shigeo Tani, Osaka (JP); Toshinori Koyanagi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/382,510

(22) Filed: Aug. 25, 1999

(30) Foreign Application Priority Data

Aug. 28, 1998 (JP) .......................................... 10-243684

(51) Int. Cl.$^7$ ................................................ H04L 7/00
(52) U.S. Cl. ........................ 375/357; 375/368; 370/509
(58) Field of Search ................................ 375/366, 357, 375/362, 365, 368; 370/506, 509, 512

(56) References Cited

U.S. PATENT DOCUMENTS 4,393,492 A * 7/1983 Bishop ....................... 370/225
4,574,377 A * 3/1986 Miyazaki et al. ........... 370/510

\* cited by examiner

*Primary Examiner*—Phuong Phu
(74) *Attorney, Agent, or Firm*—Katten Muchin Zavis Rosenman

(57) ABSTRACT

A frame synchronism processing apparatus including a first detecting unit for detecting the synchronism of a subframe, a second detecting unit for detecting the synchronism of a multiframe, and a synchronism detection retrying control unit for forcibly bringing the first detecting unit and the second detecting unit into a synchronism detection retrying mode if the second detecting unit has failed to detect the synchronism of the multiframe. Assuring that a false synchronous state is brought about on the subframe synchronism with the result that the detection of the synchronism of the multiframe has been failed, the detection of synchronism of the subframes and the detection of synchronism of the multiframe are retried, thus avoiding a deadlock of frame synchronism process due to the possible false synchronous state and hence improving the reliability in synchronism process.

19 Claims, 14 Drawing Sheets

| PLCP (1 OCTEL) | FRAMING (1 OCTEL) | POI (1 OCTEL) | POH (1 OCTEL) | PLCP PAYLOAD (53 OCTEL) | |
|---|---|---|---|---|---|
| A1 | A2 | P11 | Z6 | FIRST ATM CELL | |
| A1 | A2 | P10 | Z5 | ATM CELL | |
| A1 | A2 | P09 | Z4 | ATM CELL | |
| A1 | A2 | P08 | Z3 | ATM CELL | |
| A1 | A2 | P07 | Z2 | ATM CELL | |
| A1 | A2 | P06 | Z1 | ATM CELL | |
| A1 | A2 | P05 | X | ATM CELL | |
| A1 | A2 | P04 | B1 | ATM CELL | |
| A1 | A2 | P03 | G1 | ATM CELL | |
| A1 | A2 | P02 | X | ATM CELL | |
| A1 | A2 | P01 | X | ATM CELL | 13 OR 14 NIBBLES |
| A1 | A2 | P00 | C1 | TWELFTH ATM CELL | TRAILER |

A1, A2 : FRAME PATTERN (F628)
POI : PATH OVERHEAD INDICATOR
POH : PATH OVERHEAD
X : UNASSIGNED-RECEIVER REQUIRED TO IGNORE

FRAME SYNCHRONISM PROCESSING APPARATUS AND FRAME SYNCHRONISM PROCESSING METHOD

BACKGROUND OF THE INVENTION

1) Field of the Invention

This invention relates to a frame synchronism processing apparatus and a frame synchronism processing method suitable for use in a case wherein data transmission is carried out using a predetermined frame.

2) Description of the Related Art

A frame synchronism processing apparatus is arranged to detect information for synchronization acquisition (frame synchronism establishment) in a transmission signal (transmission frame) so that frame synchronism is established. For example, if a frame to be transmitted is a DS3 (Digital Signal-Level 3) signal, a frame synchronism processing apparatus 1a is arranged to include a DS3 subframe synchronism detecting unit (DS3 subframe Sync unit) 2a, a DS3 multiframe synchronism detecting unit (DS3 multiframe Sync unit) 3a, an OR circuit 6b, and a data inhibit/ nibble switch unit (Data Inhibit+Nibble SW) 6a, as shown in FIG. 12.

It is to be noted that, as shown in FIG. 9, a frame format of a DS3 signal is formed as a DS3 multiframe which includes seven DS3 subframes each including a plurality of sets of an overhead part and a payload part. The overhead part (1 bit) in the DS3 subframes has information unique in the DS3 multiframe such as "F1", "F2", "F3", "F4", "M1", "M2", "M3", "X1", "X2" and so forth stored therein as seen from FIG. 9.

Here, each of "F1", "F2", "F3", and "F4" is a bit representative of a synchronizing pattern of a DS3 subframe, and fixed patterns of "1", "0", "0" and "1" are allocated to them. Meanwhile, each of "M1", "M2", and "M3" is a bit representative of a synchronizing pattern of a DS3 multiframe, and fixed values of "0", "1" and "0" are allocated to them. It is to be noted that various data are mapped in the payload part (84 bits).

Referring back to FIG. 12, the DS3 subframe synchronism detecting unit 2a detects synchronism of received DS3 subframes. In particular, the DS3 subframe synchronism detecting unit 2a detects bits ("F1", "F2", "F3", "F4") in the DS3 subframes and discriminates whether or not they coincide with the synchronizing pattern ("1", "0", "0", "1"). If the DS3 subframe synchronism detecting unit 2a detects coincidence with the synchronizing pattern, then it outputs a signal indicating this to the DS3 multiframe synchronism detecting unit 3a.

If the synchronism of the DS3 subframes is detected by the DS3 subframe synchronism detecting unit 2a, then the DS3 multiframe synchronism detecting unit 3a detects predetermined bits ("M1", "M2", "M3") from a plurality of DS3 subframes and discriminates whether or not the detected bits coincide with the synchronizing pattern ("0", "1", "0").

The data inhibit/nibble switch unit 6a inhibits outputting of data while it receives, from any one of the DS3 subframe synchronism detecting unit 2a and the DS3 multiframe synchronism detecting unit 3a through the OR circuit 6b, information (out of frame information) that synchronism cannot be detected. However, while the data inhibit/nibble switch unit 6a receives, from both the DS3 subframe synchronism detecting unit 2a and the DS3 multiframe synchronism detecting unit 3a, information that synchronism is detected (synchronous state), it extracts the payload parts except the overhead parts from the received DS3 multiframe and outputs the payload parts.

Since the frame synchronism processing apparatus 1a detects the particular bits ("F1"="1", "F2"="0", "F3"="0", "F4"="1") of DS3 subframes of a received DS3 multiframe to detect the synchronism of the DS3 subframes and then detects the particular bits "M1"="0", "M2"="1", "M3"="0") in the DS3 multiframe in this manner, the frame synchronism processing apparatus 1a can establish the synchronism of the DS3 frames.

FIG. 10 illustrates a method of mapping an ATM cell in a PLCP (Physical Layer Convergence Protocol) frame. As shown in FIG. 10, an ATM cell can be mapped in the payload part in a PLCP frame, and the PLCP frame can be stored into a payload part (84 bits) of a DS3 frame.

Where a PLCP frame is mapped in a payload part (84 bits) of such a DS3 frame as described above, for example, as shown in FIG. 13, the frame synchronism processing apparatus 1a further includes a PLCP frame synchronism detecting unit 4a, which in turn includes a detecting unit 4-1a, a discriminating unit 4-2a, a POI (Path Overhead Indicator) detecting unit 4-3a, a POI check unit 4-4a, a POL (Path Overhead Label)discriminating unit 4-5a, a frame pattern check unit 4-6a, and a frame counter (FCTR) 4-11a.

It is to be noted that, for example, as shown in FIG. 11, also a frame format of a PLCP signal includes an overhead part 16 and a payload part 17. It is to be noted that reference numeral 18 denotes a trailer (stuff bits) for bit number adjustment.

Here, the overhead part 16 has framing octets ("A1", "A2"), a POI and a POH (Path Overhead) stored therein. "A1" and "A2" are bits representative of a synchronizing pattern of a PLCP frame and have fixed values of "A1"= "F6" (hex), "A2"="28" (hex) stored therein, respectively. Further, POI is information indicating that it is followed by a POH.

Referring back to FIG. 13, the detecting unit 4-1a detects "A1" and "A2" from the PLCP frame described above. The discriminating unit 4-2a determines whether or not "A1", "A2" are equal to "F6", "28", respectively.

The POI detecting unit 4-3a detects the POI described above from a PLCP frame. The POI check unit 4-4a performs a parity check. The POL discriminating unit 4-5a determines what numbered set (slot) the set is in the entire frame. The frame pattern check unit 4-6a determines whether or not information received from the discriminating unit 4-2a, POI check unit 4-4a and POL discriminating unit 4-5a satisfies a desired requirement. The frame counter 4-11a outputs an address of a memory (not shown) into which data outputted from a byte switch 7a is to be stored after synchronism is established.

The frame synchronism processing apparatus 1a which includes the PLCP frame synchronism detecting unit 4a having such a construction as described above detects a synchronizing pattern based on the particular bits ("A1"= "F6", "A2"="28") in a PLCP frame to establish the synchronism of the PLCP frame.

As described above, the frame synchronism processing apparatus 1a detects the F bits ("F1", "F2", "F3", "F4") of the DS3 frame format from received data and detects the M bits ("M1", "M2", "M3") of the DS3 multiframe after synchronism of DS3 subframes is detected.

The received data can contain an alarm signal (ALL "0") such as an AIS (Alarm Indication Signal) if a failure or the like occurs in the connection.

The F bits ("F1", "F2", "F3", "F4") which are a synchronizing pattern of DS3 subframes are disposed in a distributed condition as seen in FIG. 9, and since this synchronizing pattern is a synchronizing pattern of 4 bits, a data train same as the F bits possibly appears in received data as a result of influence of propagation of an AIS.

In this instance, although the pattern in the signal does not correspond to the original DS3 subframe synchronizing pattern, there is the possibility that the pattern is erroneously detected as the normal synchronizing pattern and a false synchronizing state is brought about.

In this case, the synchronism of the DS3 multiframe depends upon the synchronism of the DS3 subframes while the synchronism of the DS3 subframes does not depend upon the synchronism of the DS3 multi frame, if the synchronism of DS3 subframes is erroneously detected in the frame synchronous processing apparatus 1a due to a generation of AIS or the like with the result that a false synchronous state is brought about on the DS3 subframes, then the synchronism of a DS3 multiframe cannot be established, resulting in a deadlock state in the DS3 multiframe synchronism detecting unit 3a.

Also in regard to synchronism detection of a PLCP frame, since the synchronism of the PLCP frame depends upon the synchronism of DS3 subframes, if a false synchronizing state is brought about on the DS3 subframes, then the frame synchronism processing apparatus 1a fails to establish synchronism of the PLCP frame, leading to a deadlock state.

SUMMARY OF THE INVENTION

The present invention is made in view of the above aspect and an object of the present invention is to provide a frame synchronism processing apparatus and a frame synchronism processing method in which if a false synchronous state is brought about on the synchronism of the subframe with the result that it becomes impossible to establish the synchronism on the multiframe, then synchronism detection is again carried out on each of the frames. Therefore, a deadlock caused from the false synchronous state can be avoided and reliability in processing for establishing synchronism can be improved.

In order to attain the above object, the frame synchronism processing apparatus according to the present invention is arranged to include a first detecting unit for detecting synchronism of the subframes, a second detecting unit for detecting synchronism of the multiframe after the first detecting unit detects the synchronism of the subframes, and a compulsory synchronism detection retrying control unit for compulsorily bringing the first detecting unit and the second detecting unit to a synchronism detection retrying mode if the second detecting unit fails to detect the synchronism of the multiframe after an elapse of a predetermined time after the first detecting unit has detected the synchronism of the subframes.

According to the frame synchronism processing apparatus of the present invention, even if a false synchronous state is brought about on the synchronism of the subframes due to a generation of an AIS cell or the like, with the result that the second detecting unit fails to detect the synchronism of the multiframe after the elapse of the predetermined time after the first detecting unit has detected the synchronism of the subframes, the compulsory synchronism detection retrying control unit brings the first detecting unit and the second detecting unit into the synchronism detection retrying mode. Therefore, a deadlock upon the false synchronous can be avoided and reliability in processing for establishing synchronism can be improved.

According to another aspect of the present invention, there is proposed a frame synchronism processing method comprising the steps of a first detecting step of detecting synchronism of the subframes, a second detecting step of detecting synchronism of the multiframe after the synchronism of the subframes is detected in the first detecting step, and a compulsory synchronism detection retrying step of compulsorily retrying the synchronism detection on each of the frames from the first detecting step if the synchronism of the multiframe is failed to be detected in the second detecting step after an elapse of a predetermined time after the synchronism of the subframes is detected in the first detecting step.

Therefore, according to the frame synchronism processing method of the present invention, if the false synchronous state is brought about on the synchronism of the subframe due to a generation of an AIS cell or the like, with the result that the synchronism of the multiframe is failed to be detected in the second detecting step after an elapse of the predetermined time after the synchronism of the subframes is detected in the first detecting step, the synchronism detection processing is carried out on each of the frames from the first detecting step in the compulsory synchronism detection retrying step. Therefore, a deadlock upon a false synchronous state can be avoided and the reliability in processing for establishing synchronism can be improved.

According to another aspect of the present invention, there is provided a frame synchronism processing apparatus, comprising a plurality of frame synchronism detecting units for receiving a transmission frame composed of a plurality of unit frames hierarchically arranged by nesting one another and detecting the synchronism of the unit frames at each of the hierarchies, and a compulsory synchronism detection retrying control unit for compulsorily bringing all of the frame synchronism detecting units into a synchronism detection retrying mode if the synchronism is failed to be detected by any one of the plurality of frame synchronism detecting units.

Therefore, according to the frame synchronism processing apparatus of the present invention, if a false synchronous state is brought about on any one of the unit frames due to a generation of an AIS cell or the like, with the result that any one of the plurality of frame synchronism detecting units fails to detect the synchronism, the compulsory synchronism detection retrying control unit compulsorily brings all of the frame synchronism detecting units into the synchronism detection retrying mode. Therefore, a deadlock upon a false synchronizing state can be avoided and the reliability in synchronism establishing processing can be improved.

According to a still another aspect of the present invention, there is provided a frame synchronism processing method, comprising the steps of a frame synchronism detecting step of receiving a transmission frame composed of plurality of unit frames hierarchically arranged by nesting one another and detecting the synchronism of the unit frames at each of hierarchies, and a compulsory synchronism detection retrying step of compulsorily performing the synchronism detection processing for all of the unit frames if the synchronism is failed to be detected in the frame synchronism detecting step.

Therefore, according to the frame synchronism processing method of the present invention, if false synchronous state is brought about on any one of the unit frames due to a generation of an AIS cell or the like, with the result that the synchronism of any one of the unit frames is failed to be detected in the frame synchronism detecting step, the synchronism detection processing is compulsorily performed again for all of the unit frames in the synchronism detection retrying step. Therefore, a deadlock upon a false synchronous state can be avoided and the reliability in the synchronism establishing processing can be improved.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 11 is a diagram illustrating a PLCP frame format;

DESCRIPTION OF THE PREFERRED EMBODIMENT a. First Embodiment

Figure 1:
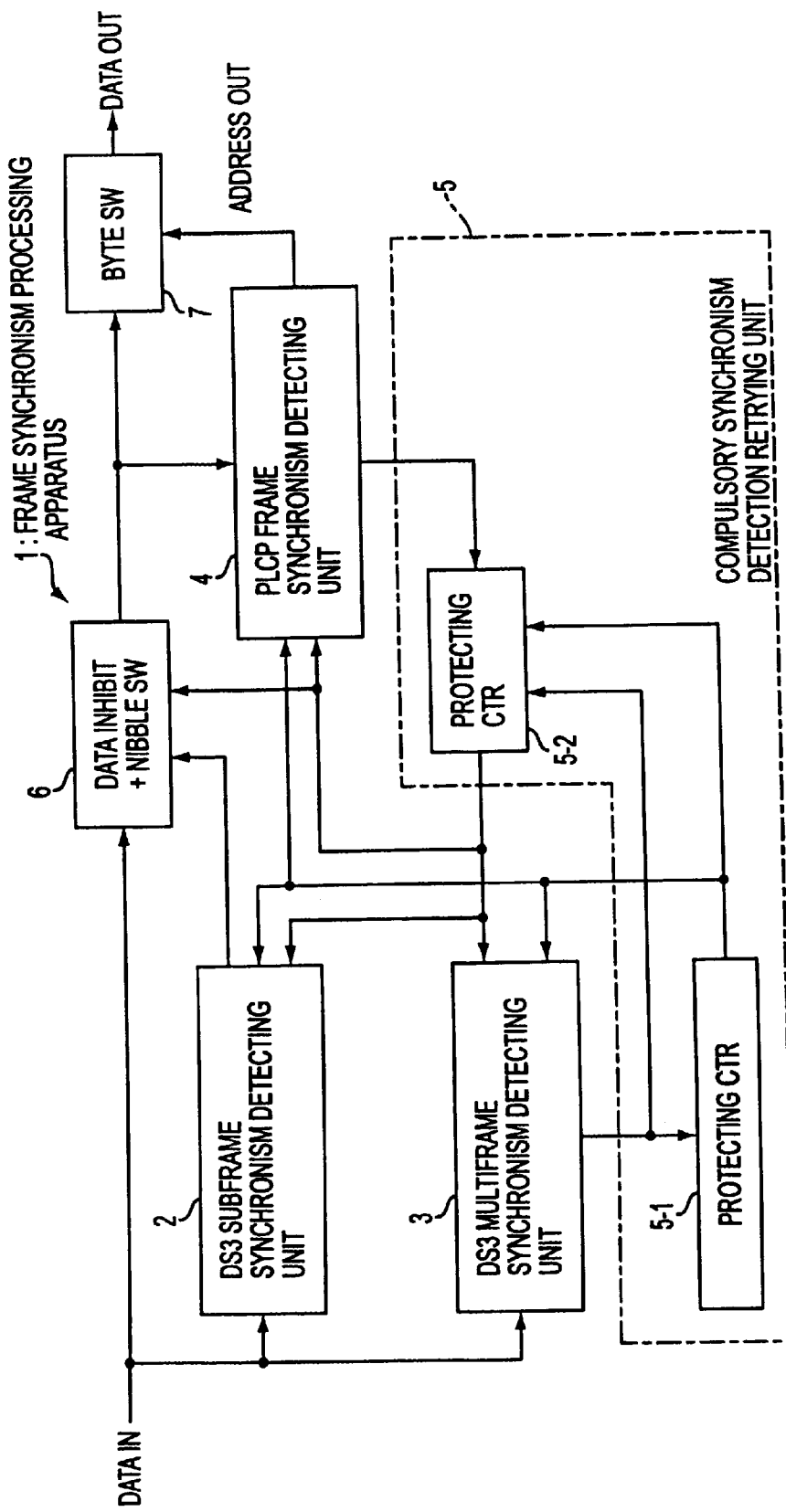
FIG. 1 is a block diagram showing a construction of a frame synchronism processing apparatus according to a first embodiment of the present invention.

Referring first to FIG. 1, there is shown a construction of a frame synchronism processing apparatus according to a first preferred embodiment of the present invention. The frame synchronism processing apparatus generally denoted at 1 receives a signal of a DS3 multiframe composed of a plurality of DS3 subframes and detects synchronism of the DS3 subframes and then detects synchronism of the DS3 multiframe, and further detects synchronism of a PLCP frame. Further, the frame synchronism processing apparatus 1 compulsorily try to detect synchronism again under predetermined conditions.

To this end, the frame synchronism processing apparatus 1 includes, as shown in FIG. 1, a DS3 subframe synchronism detecting unit 2, a DS3 multiframe synchronism detecting unit 3, a PLCP frame synchronism detecting unit 4, a compulsory synchronism detection retrying control section 5, a data inhibit/nibble switch unit (Data Inhibit+Nibble SW) 6, and a byte switch 7 (Byte SW).

Figure 2:
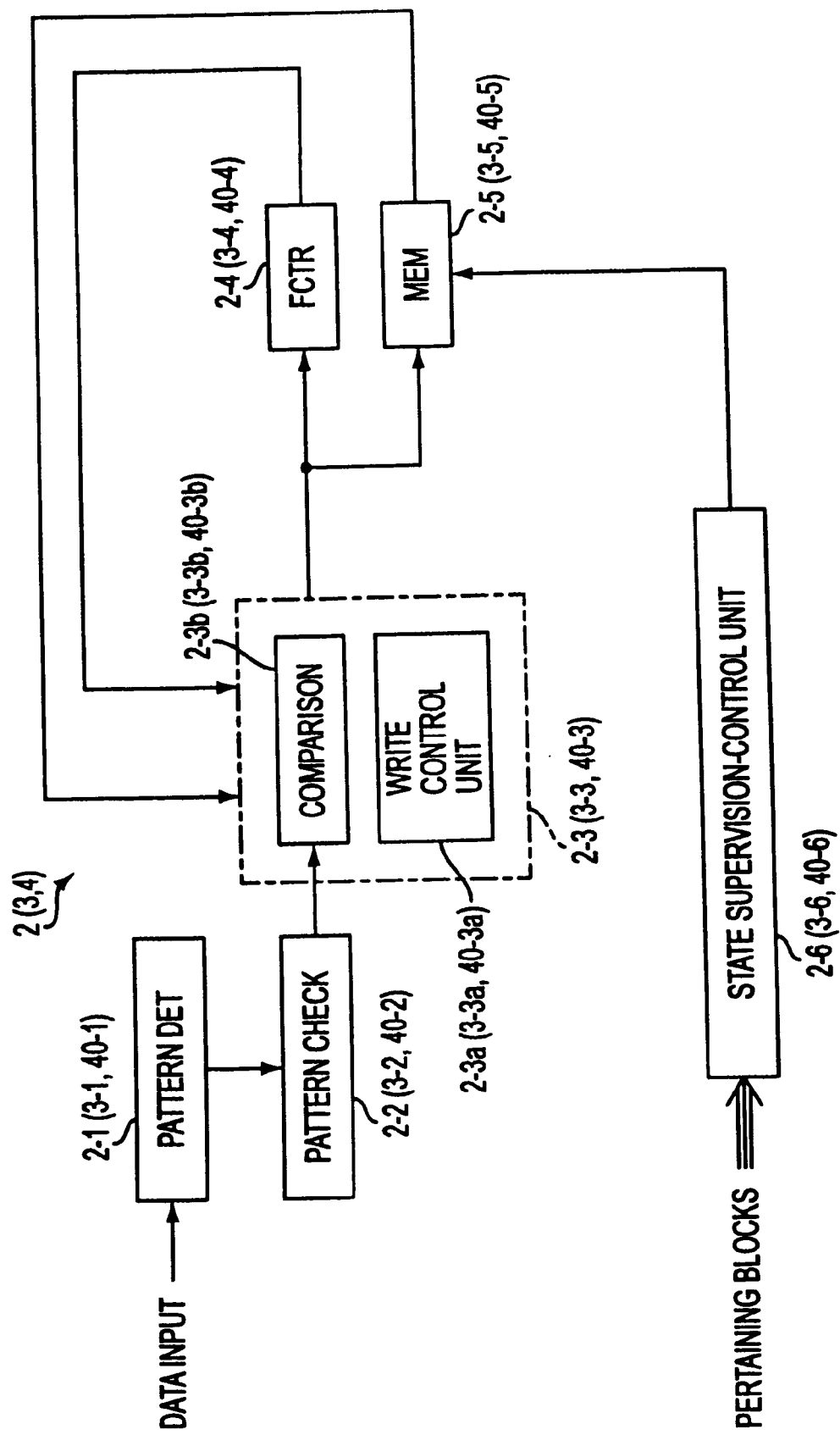
FIG. 2 is a block diagram showing a construction of a DS3 subframe synchronism detecting unit of the frame synchronism processing apparatus.
Figure 9:
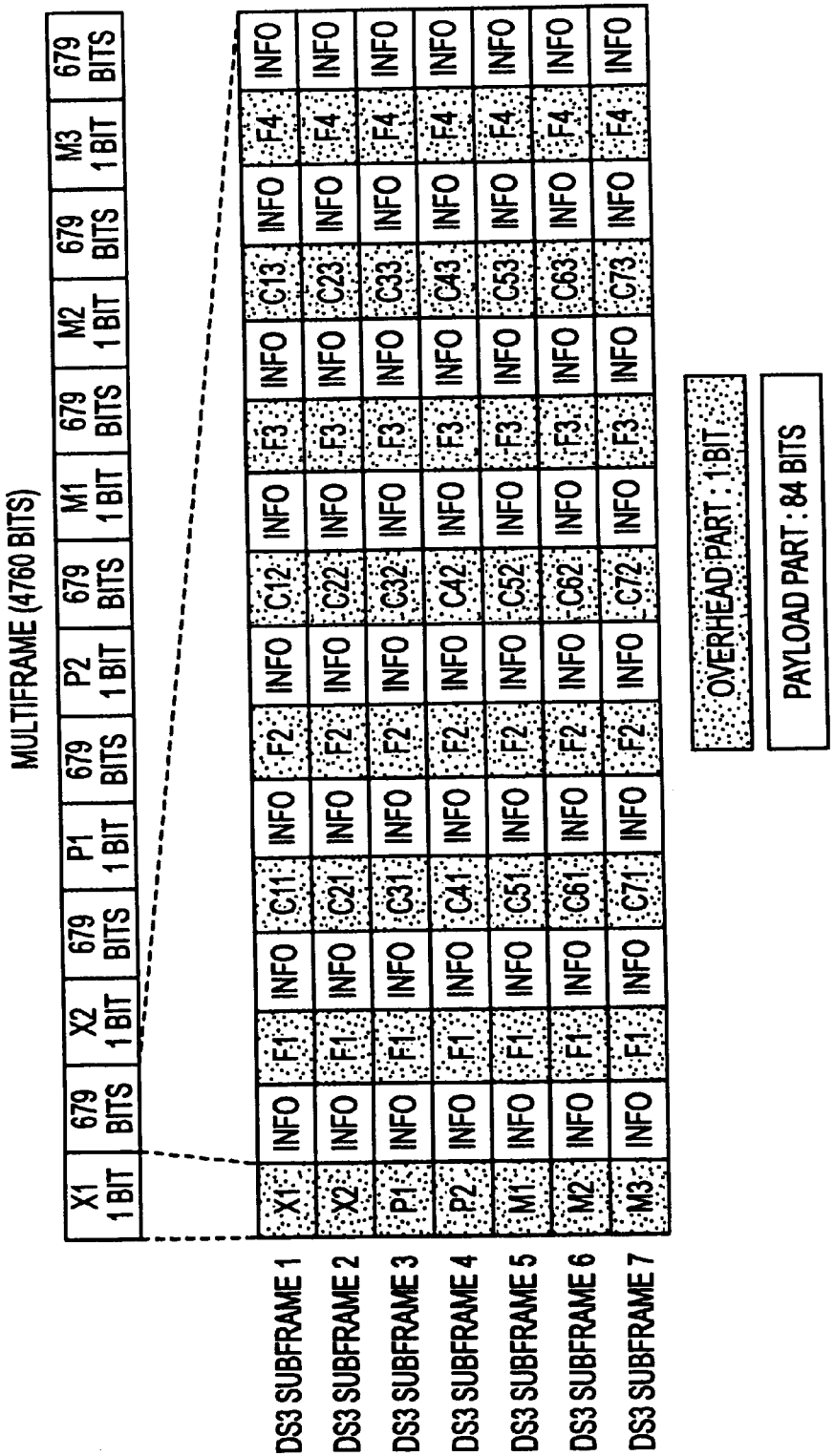
FIG. 9 is a diagram showing a frame format of a DS3 signal.
Figure 10:
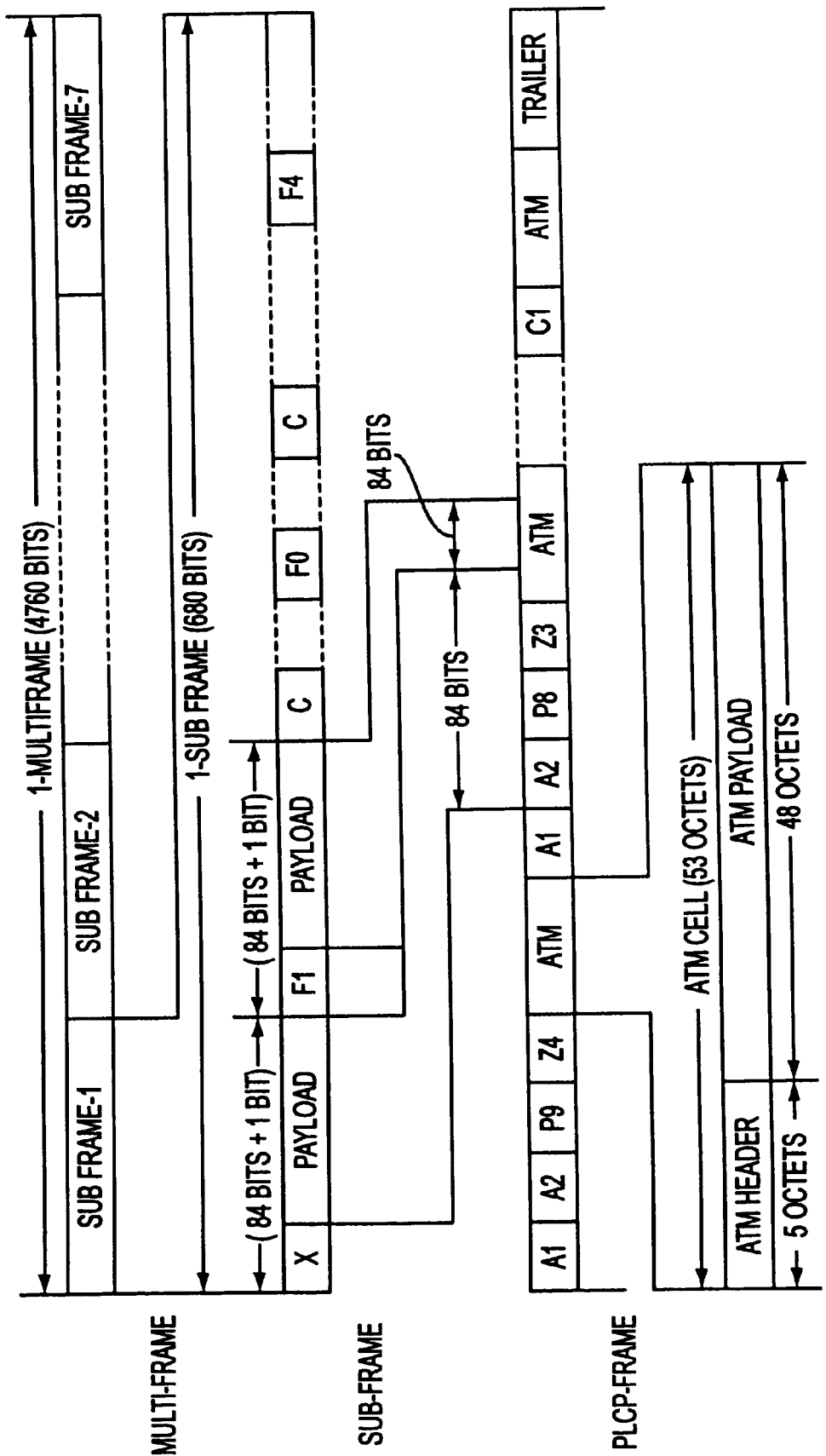
FIG. 10 is a diagram illustrating a method of mapping an ATM cell in a PLCP frame.
Figure 12:
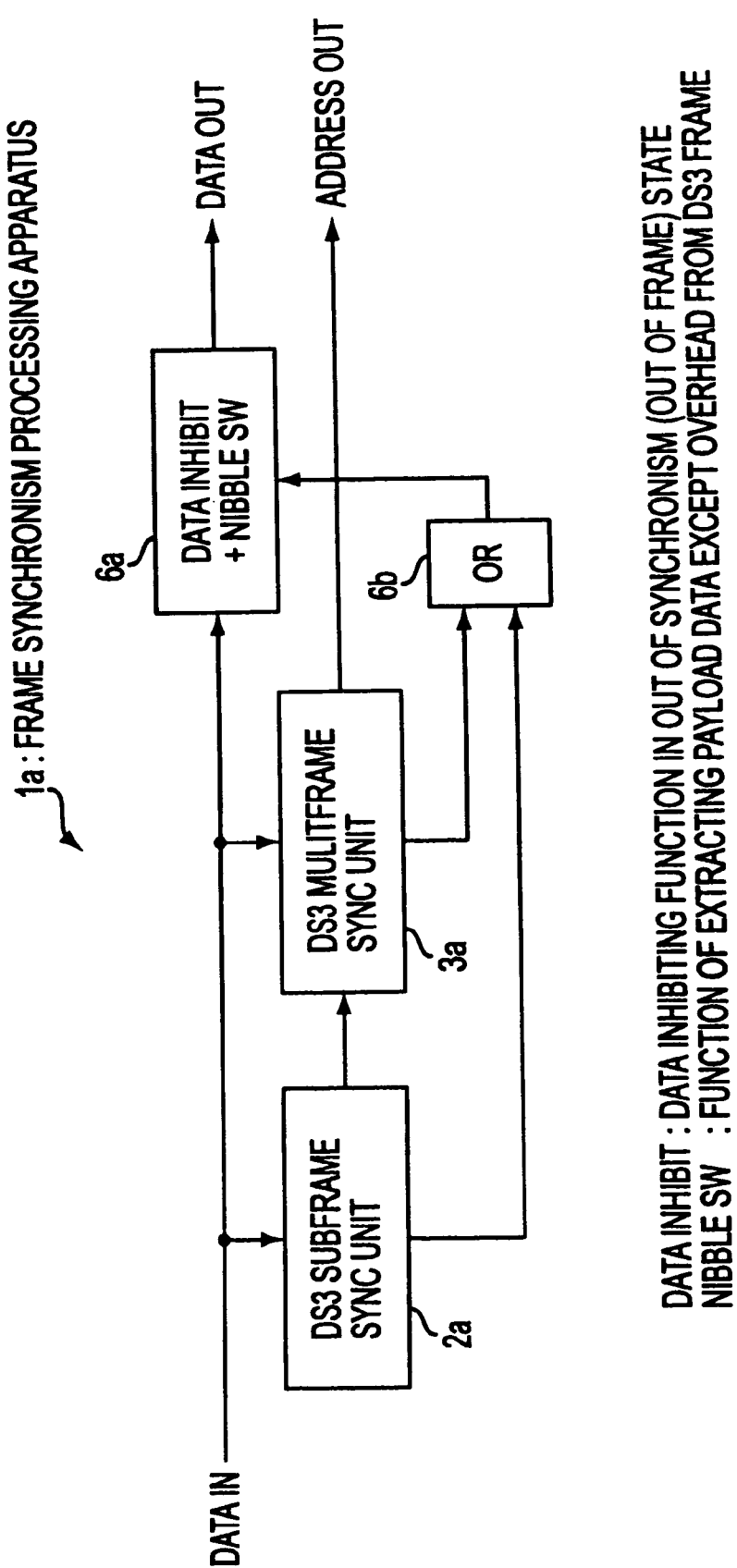
FIG. 12 is a block diagram showing a frame synchronism processing apparatus.
Figure 13:
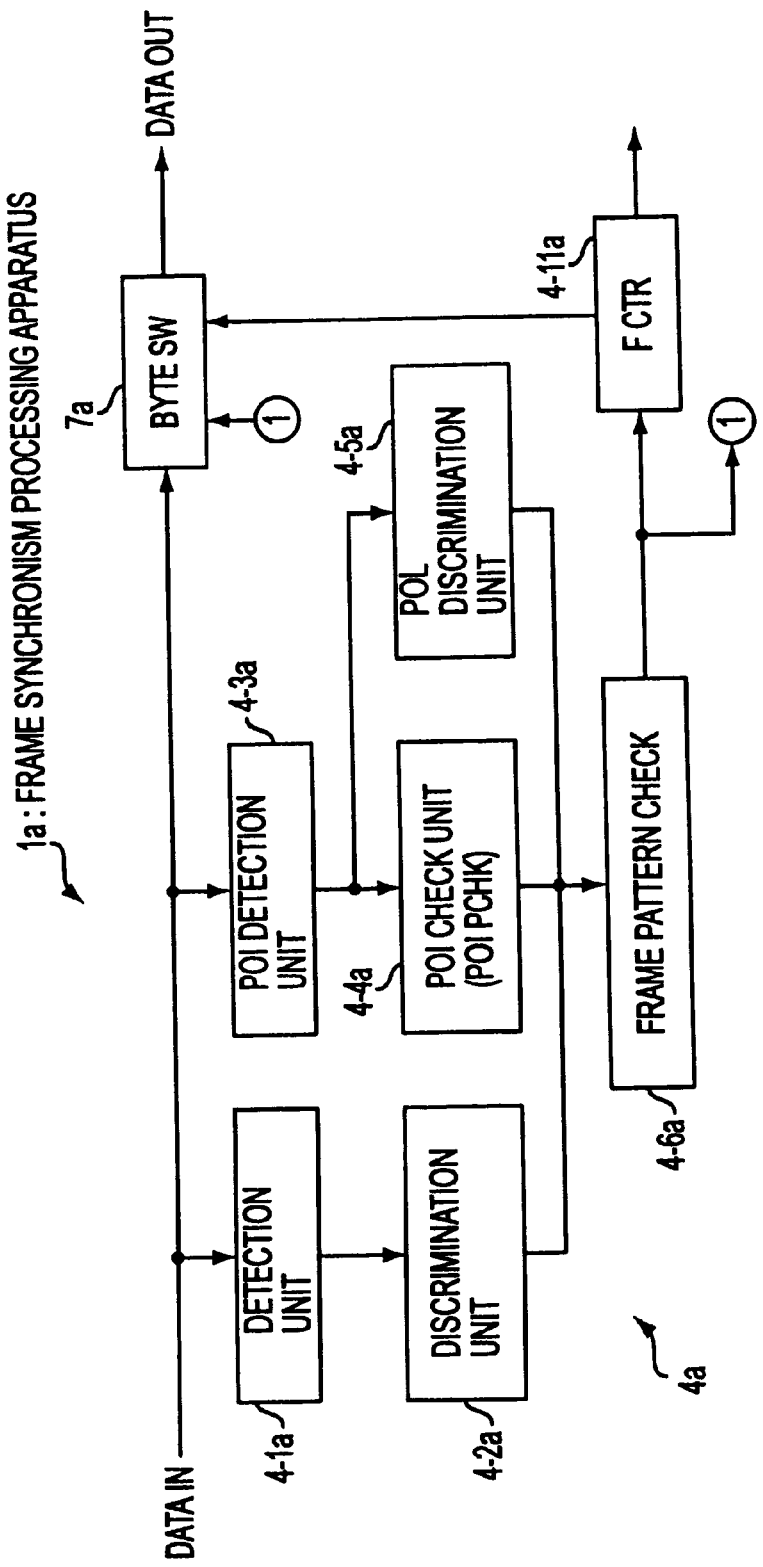
FIG. 13 is a block diagram showing another frame synchronism processing apparatus.

The DS3 subframe synchronism detecting unit (first detecting unit) 2 detects synchronism of DS3 subframes and detects the bits ("F1"="1", "F2"="0", "F3"="0", "F4"="1") of the subframes shown in FIG. 9. FIG. 2 shows a construction of the DS3 subframe synchronism detecting unit 2. Referring to FIG. 2, the DS3 subframe synchronism detecting unit 2 includes a pattern detecting unit 2-1, a pattern check unit 2-2, a comparison processing unit 2-3, a counter 2-4, a memory 2-5, and a state supervision-control unit 2-6.

The pattern detecting unit 2-1 extracts a frame pattern of DS3 subframes from input data. The pattern check unit 2-2 checks whether or not the bits detected by the pattern detecting unit 2-1 and corresponding to "F1", "F2", "F3", "F4" of the frame pattern coincide with the DS3 subframe synchronizing pattern ("F1"="1", "F2"="0", "F3"="0", "F4"="1"). It is to be noted that, if it is discriminated by the pattern check unit 2-2 that the bits coincide with the synchronizing pattern, then the memory 2-5 stores, for example, the positions of the bits ("F1", "F2", "F3", "F4") in the frame pattern detected by the pattern detecting unit 2-1.

The comparison processing unit 2-3 performs, when a frame pattern of DS3 subframes which coincides with the synchronizing pattern of DS3 subframes is detected in a process of detection of synchronism, control to write the positions of the bits ("F1", "F2", "F3", "F4") in the frame pattern into the memory 2-5, and performs, after coincidence with the synchronizing pattern of DS3 subframes is detected once, comparison to determine whether or not the synchronism of the frame pattern of DS3 subframes can be detected at the same bit positions.

To this end, the comparison processing unit 2-3 includes, as shown in FIG. 2, a write control unit 2-3a and a comparing unit 2-3b.

The write control unit 2-3a performs, once coincidence with the synchronizing pattern is detected by the pattern check unit 2-2, control to write the positions of the bits ("F1", "F2", "F3", "F4") in the frame pattern detected by the pattern detecting unit 2-1 into the memory 2-5. It is to be noted that, when the bit positions stored in the memory 2-5 are cleared or in a like case, the write control unit 2-3a writes the bit positions again.

Meanwhile, the comparing unit 2-3b performs comparison to determine whether or not the synchronism of DS3 subframes can be detected at the bit positions stored in the memory 2-5 again. If a result of the comparison proves that the bit positions coincide with the synchronizing pattern, the comparing unit 2-3b outputs a signal indicative of coincidence to the counter 2-4.

It is to be noted that, if it is presumed that the maximum count of the counter 2-4 is "4" as an example, then when the count comes to "4", the synchronism of DS3 subframes is established.

The state supervision-control unit 2-6 clears bit positions stored in the memory 2-5 when synchronism is to be compulsorily detected again under the control of the compulsory synchronism detection retrying control unit 5 or the PLCP frame synchronism detecting unit 4.

On the other hand, the DS3 multiframe synchronism detecting unit (second detecting unit) 3 detects synchronism of a DS3 multiframe after the synchronism is detected by the DS3 subframe synchronism detecting unit 2, and particularly detects the bits ("M1", "M2", "M3") in the DS3 subframes shown in FIG. 9.

Also the DS3 multiframe synchronism detecting unit 3 can be constructed in a similar manner to the DS3 subframe synchronism detecting unit 2 described hereinabove with reference to FIG. 2 and includes a pattern detecting unit 3-1, a pattern check unit 3-2, a comparison processing unit 3-3, a counter 3-4, a memory 3-5, and a state supervision-control unit 3-6. The pattern detecting unit 3-1 of the DS3 multiframe synchronism detecting unit 3 extracts a frame pattern from received data. The pattern check unit 3-2 checks whether or not the bits detected by the pattern detecting unit 3-1 and corresponding to "M1", "M2", "M3" in the frame pattern detected by the pattern detecting unit 3-1 coincide with the synchronizing pattern ("M1"="0", "M2"="1", "M3"="0"). It is to be noted that, if it is determined by the pattern detecting unit 3-1 that the bits coincide with the synchronizing pattern, then the memory 3-5 stores, for example, the positions of the bits ("M1", "M2", "M3") of the frame pattern detected by the pattern detecting unit 3-1.

The comparing unit 3-3b performs, once synchronism of a DS3 multiframe is detected, comparison to determine whether or not the synchronizing pattern of the DS3 multiframe coincides again with the synchronizing pattern at the bit positions stored in the memory 3-5. The number of times by which coincidence with the synchronizing pattern of DS3 subframes is detected is counted by the counter 3-4.

If it is assumed that the maximum count of the counter 3-4 is "2" as an example, then when the count number reaches "2", a synchronous state of the DS3 multiframe is reached. If coincidence with the synchronizing pattern is not detected by a pattern check, then the counter 3-4 or the comparing unit 3-3b outputs a signal indicative of this to the compulsory synchronism detection retrying control unit 5.

On the other hand, the state supervision-control unit 3-6 clears bit positions stored in the memory 2-5 when synchronism is, to be compulsorily detected again under the control of the compulsory synchronism detection retrying control unit 5 or the PLCP frame synchronism detecting unit 4.

The PLCP frame synchronism detecting unit (third detecting unit) 4 detects, after synchronism of DS3 subframes is detected by the DS3 subframe synchronism detecting unit 2, synchronism of PLCP frame which is stored in the DS3 subframes and different from the DC3 subframes and the DS3 multiframes. The PLCP frame synchronism detecting unit 4 further has a function of correcting an error of the "C1" bytes of a PLCP frame and another function of supervising the trailer (Cycle Stuff Byte) 18 of a PLCP frame (refer to FIG. 11).

Figure 3:
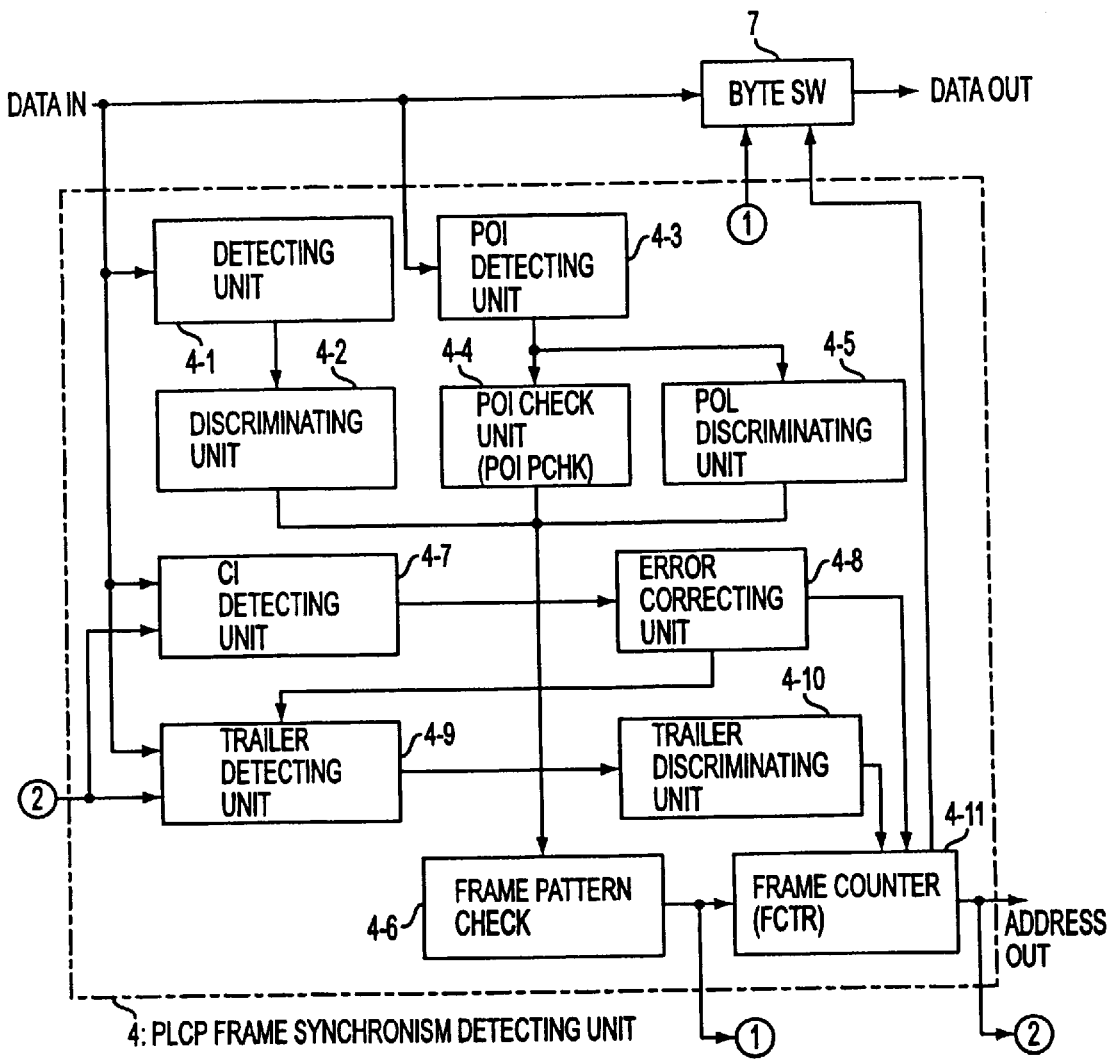
FIG. 3 is a block diagram showing a construction of a PLCP frame synchronism detecting unit of the frame synchronism processing apparatus.

To this end, for example, as shown in FIG. 3, the PLCP frame synchronism detecting unit 4 includes a detecting unit 4-1, a discriminating unit 4-2, a POI detecting unit 4-3, a POI check unit 4-4, a POL discriminating unit 4-5, a frame pattern check unit 46, a C1 detecting unit 4-7, an error correcting unit 4-8, a trailer detecting unit 4-9, a trailer discriminating unit 4-10, and a frame counter (F CTR) 4-11.

The detecting unit 4-1 detects bits corresponding to "A1" and "A2" (refer to FIG. 11) from a received PLCP frame. The discriminating unit 4-2 determines whether or not "A1" and"A2" detected by the detecting unit 4-1 coincide with the synchronizing pattern ["A1"="11110110" (F6[hex]) and "A2"="00101000" (28[hex])].

It is to be noted that the detecting unit 4-1 and the discriminating unit 4-2 may be combined so as to have such a construction similar to that of the DS3 subframe synchronism detecting unit 2 or the DS3 multiframe synchronism detecting unit 3 as shown in FIG. 2. If the detecting unit 4-1 and the discriminating unit 4-2 are arranged to be combined as seen in FIG. 2, a pattern check unit 40-2 determines whether or not bytes in a frame pattern detected by a pattern detecting unit 40-1 and corresponding to "A1" and "A2" coincide with the synchronizing pattern ["A1"="F6" [hex], "A2"="28" [hex]]. If coincidence with the synchronizing pattern is detected, then a write control unit 40-3a performs control of writing the bit positions into a memory 40-5. Thereafter, a comparing unit 40-3b performs comparison to determine whether or not the synchronizing pattern is detected at the bit positions stored in the memory 40-5. If coincidence with the synchronizing pattern is detected, then the write control section 40-3a outputs a signal indicative of this to a counter 40-4. The counter 40-4 counts up the number of times by which coincidence with the synchronizing pattern is detected.

A state supervision-control unit 40-6 clears bit positions stored in the memory 40-5 when synchronism detection is retried under the control of the compulsory synchronism detection retrying unit 5 or the frame counter 4-11.

It is to be noted that, if coincidence with the synchronizing pattern is not detected by a pattern check, then the pattern check unit 40-2 or the comparison unit 40-3b outputs a signal indicating this to the compulsory synchronism detection retrying control unit 5.

The POI detecting unit 4-3 detects data corresponding to the POI from within received data. The POI check unit 4-4 performs a parity check. The POL discriminating unit 4-5 performs discrimination of the POL indicated by 6-bits in the POI bytes.

The frame pattern check unit 4-6 checks to determine whether or not three signals from the discrimination unit 4-2, POI check section 4-4 and POL discrimination unit 4-5 are desired ones. If the three signals correspond to the desired ones, then the frame pattern check unit 4-6 outputs a signal indicating this, for example, a signal indicative of the top of the PLCP frame, to the frame counter 4-11 and the byte switch 7.

The frame counter 4-11 synthetically discriminates a synchronous state based on signals from the frame pattern check unit 4-6, error correcting unit 4-8 and trailer discriminating unit 4-10, and performs establishment of synchronism, detection of bit displacement while synchronism is established, and control of synchronism detection processing again when bit displacement is detected.

It is to be noted that the frame counter 4-11 discriminates, upon discrimination of establishment of synchronism, that synchronism is established, for example, when the discrimination unit 4-2 detects twice that detected "A1" and "A2" coincide with "F6" and "28", respectively. Further, if synchronism is established, then the frame counter 4-11 outputs a signal indicating this to the byte switch 7 and outputs, to a memory not shown (a memory for storing data outputted from the byte switch 7), an address of the memory into which a 1 PLCP frame is to be stored. Further, the frame counter 4-11 outputs, for example, a signal indicative of the top position of the PLCP frame to the C1 detecting unit 4-7 and the trailer detecting unit 4-9.

Further, after the synchronism is established, if a signal indicating that an error is not correctable is received from the error correcting unit 4-8 or if a signal indicating that the bit structure of one nibble does not coincide with a predetermined bit structure is received from the trailer discriminating unit 4-10, then the frame counter 4-11 determines that bit displacement has occurred and thus controls the pertaining components so that they may detect synchronism again. For example, the frame counter 4-11 counts a signal outputted from the error correcting unit 4-8 and indicating that an error is not correctable, and when a count "CTR3" of the frame counter 4-11 reaches its maximum count "16", the pertaining components are controlled so as to detect synchronism again.

The C1 detecting unit 4-7 detects the "C1" bytes from a received PLCP after synchronism is established, and outputs the detected "C1" byte to the error correcting unit 4-8.

The error correcting unit (error modification section) 4-8 detects an error of a stuff bit of a PLCP frame and modifies the detected error. In particular, the error correcting unit 4-8 detects an error of a code in the "C1" bytes detected by the C1 detecting unit 4-7, discriminates whether or not the error is correctable, and corrects, if the error is correctable, the error (error correction function)

It is to be noted that the error correcting unit 4-8 outputs, when an error is not detected or is not correctable or in some other case, a signal indicating it to the frame counter 4-11. Further, the error correcting unit 4-8 outputs a signal of detected or corrected "C1" bytes to the trailer detecting unit 4-9.

The trailer detecting unit 4-9 detects the trailer 18 with reference to the "C1" bytes received from the trailer discriminating unit 4-10 after the synchronism of a PLCP frame is established.

The trailer discriminating unit 4-10 determines whether or not the structure of bits included in the trailer 18 detected by the trailer detecting unit 4-9 is "1100" for each unit of one nibble (4 bits) For example, if the bit structure does not correspond to "1100", then the trailer discriminating unit 4-10 outputs a signal indicating this to the frame counter 4-11.

In this manner, the trailer detecting unit 4-9 and the trailer discriminating unit 4-10 have a function of supervising the Cycle Stuff Byte.

Referring back to FIG. 1, the compulsory synchronism detection retrying control unit 5 compulsorily controls the DS3 subframe synchronism detecting unit 2, DS3 multiframe synchronism detecting unit 3 and PLCP frame synchronism detecting unit 4 so that the synchronism detection may be retried.

Here, the compulsory synchronism detection retrying control unit 5 compulsorily controls the DS3 subframe synchronism detecting unit 2 and the DS3 multiframe synchronism detecting unit 3 to a synchronism detection retrying mode if synchronism of a DS3 multiframe is not detected after an elapse of a predetermined time after synchronism of DS3 subframes is detected by the DS3 subframe synchronism detecting unit 2.

To this end, the compulsory synchronism detection retrying control unit 5 includes a pair of protection counters (protection CTR) 5-1 and 5-2 as shown in FIG. 1.

The protection counter 5-1 performs counting up of its count "CTR1" while synchronous state information of the DS3 multiframe synchronism detecting unit 3 represents an out of frame state after the synchronism of DS3 subframes is established, and performs, if the synchronous state of the DS3 multiframe still stays in an out of frame state after a predetermined time (for example, T1 ms), compulsory synchronous detection retrying control beginning with the DS3 subframe synchronism detecting unit 2. In particular, the protection counter 5-1 starts its counting in response to reception of a signal outputted from the DS3 multiframe synchronism detecting unit 3 and indicating that coincidence with the synchronizing pattern is not detected, and if the count "CTR1" thereof reaches its maximum value (for example, "16"), then the protection counter 5-1 compulsorily controls the DS3 subframe synchronism detecting unit 2 and the DS3 multiframe synchronism detecting unit 3 so that synchronism detection may be retried (re-hunting) by the synchronism detecting units 2 and 3.

At this time, the protection counter 5-1 outputs a signal to the synchronism detecting units 2 and 3 so that data may not be outputted to the data inhibit/nibble switch unit 6. Further, the count "CTR1" of the protection counter 5-1 is cleared if synchronism is detected by the DS3 multiframe synchronism detecting unit 3.

On the other hand, the protection counter 5-2 performs counting up of its count "CTR2" while synchronous state information of the PLCP frame synchronism detecting unit 4 represents an out of frame state after the synchronism of DS3 sub frames is established. Then, if the synchronous state of the PLCP frame still stays in the out of frame state after a predetermined time [for example, T2 (T2>T1) ms] lapses, then the protection counter 5-2 performs compulsory synchronism detection retrying control beginning with the DS3 subframe synchronism detecting unit 2. In particular, the protection counter 5-2 begins its counting operation in response to reception of a signal outputted from the PLCP frame synchronism detecting unit 4 and indicating that coincidence with the synchronizing pattern is not detected, and when the count "CTR2" reaches its maximum value (for example, "16"), the protection counter 5-2 performs compulsory control of the DS3 subframe synchronism detecting unit 2, DS3 multiframe synchronism detecting unit 3 and PLCP frame synchronism detecting unit 4 so that synchronism detection may be retried by the synchronism detecting units 2 to 4.

It is to be noted that, also in this instance, the protection counter 5-2 outputs a signal so as not to output data to the data inhibit/nibble switch unit 6. Further, the count "CTR2" of the protection counter 5-2 is cleared when the synchronism is detected by the PLCP frame synchronism detecting unit 4. Furthermore, when the frame synchronous state changes from the out of frame state, the protection counter 5-2 is set to its initial state and supervises synchronous state information of the PLCP frame synchronism detecting unit 4 again.

The data inhibit/nibble switch unit 6 shown in FIG. 1 outputs a main signal if it receives, from the DS3 subframe synchronism detecting unit 2, information indicating that the synchronism of DS3 subframes is detected. The byte switch 7 passes the main signal when signals from all of the DS3 subframe synchronism detecting unit 2, DS3 multiframe synchronism detecting unit 3 and PLCP frame synchronism detecting unit 4 represent a synchronous state (not in an out of frame state).

Figure 4:
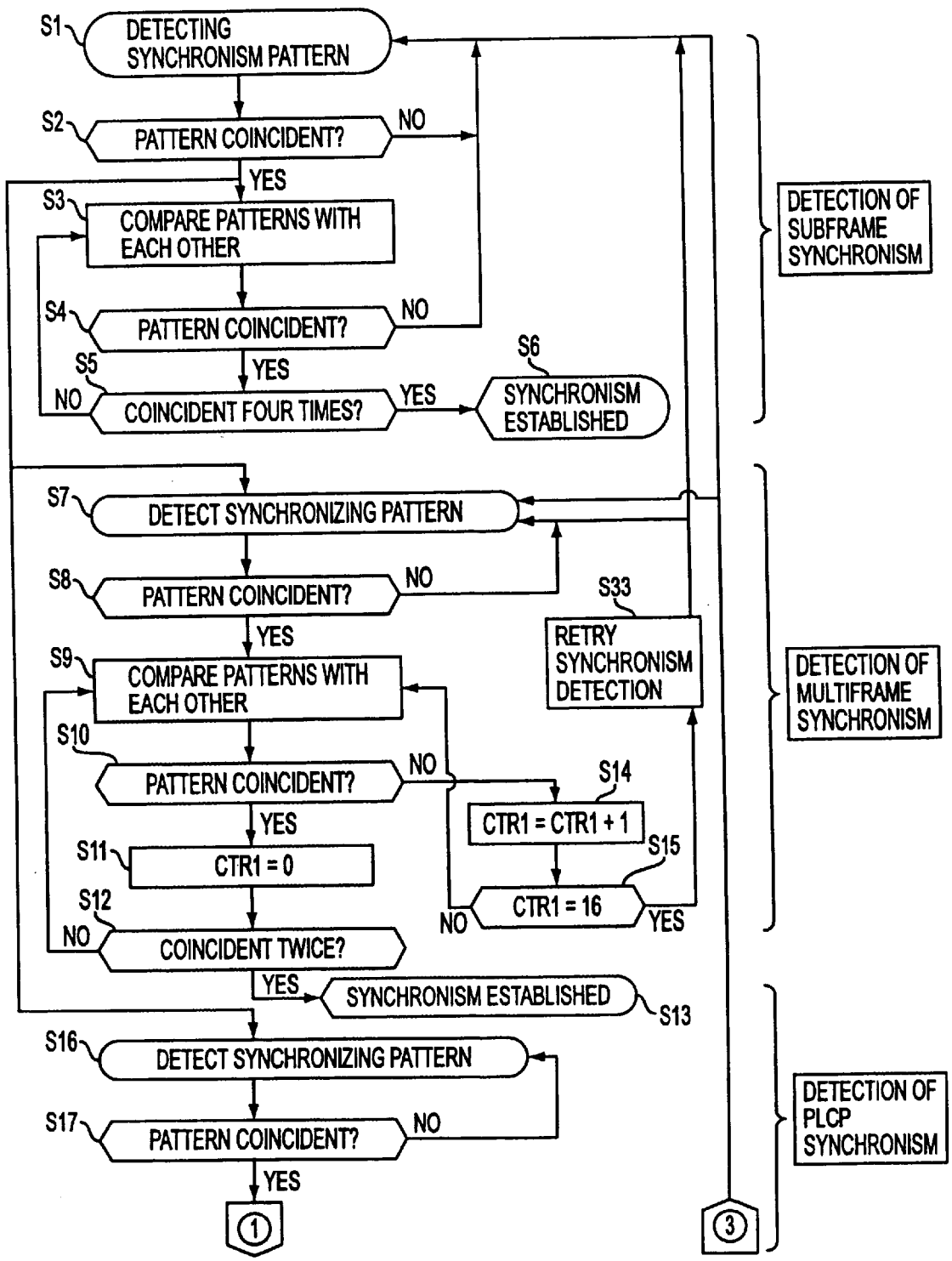
FIGS. 4 and 5 are flowcharts illustrating operation of the frame synchronism processing apparatus.

In the following, operation of the frame synchronism processing apparatus 1 according to the present embodiment having such a construction as described above is described with reference to FIGS. 4 and 5.

When the pattern detecting unit 2-1 of the DS3 subframe synchronism detecting unit 2 detects a frame pattern of DS3 subframes from received data (step S1: first detecting step), the pattern check unit 2-2 determines whether or not the bits detected by the pattern detecting unit 2-1 and corresponding to "F1", "F2", "F3", "F4" in the frame pattern detected by the pattern detecting unit 2-1 coincide with the synchronizing pattern ("F1"="1", "F2"="0", "F3"="0", "F4"="1") (step S2).

If the frame pattern detected by the pattern detecting unit 2-1 does not coincide with the synchronizing pattern of DS3 subframes, then the pattern detecting unit 2-1 repetitively performs detection of a frame pattern of DS3 subframes from the received data (from the NO route of step S2 to step S1) until coincidence with the synchronizing pattern is detected (until the discrimination in step S2 changes to YES).

On the other hand, if the detected frame pattern coincides with the synchronizing pattern, then the pattern check unit 2-2 outputs, to the comparison processing unit 2-3, DS3 multiframe synchronism detecting unit 3 and PLCP frame synchronism detecting unit 4, a signal indicating that coincidence with the synchronizing pattern of DS3 subframes is detected from the received data, and the comparing processing unit 2-3 starts comparing processing (from the YES route of step S2 to step S3). Further, the DS3 multiframe synchronism detecting unit 3 and the PLCP frame synchronism detecting unit 4 start synchronism detection processing (from the YES route of step S2 to step S7 and step S16, respectively).

Upon the comparison processing, the write control unit 2-3a writes, if the bits corresponding to "F1", "F2", "F3", "F4" in the frame pattern detected by the pattern detecting unit 2-1 coincide with the synchronizing pattern ("F1"="1", "F2"="0", "F3"="0", "F4"="1"), the bit positions detected by the pattern detecting unit 2-1 into the memory 2-5.

Then, the comparing unit 2-3b starts pattern comparison based on the bit positions stored in the memory 2-5 and the received data (step S3) and determines by comparison again based on the bit positions stored in the memory 2-5 whether or not the frame pattern detected from the received data coincides with the synchronizing pattern (step S4).

If a result of the comparison proves that the frame pattern does not coincide with the synchronizing pattern, then the comparing unit 2-3b performs detection of a frame pattern of DS3 subframes again (from the NO route of step S4 to step S1). On the other hand, if the frame pattern detected using the bit positions stored in the memory 2-5 coincides with the synchronizing pattern, then the counter 2-4 counts up its count and determines whether or not the resulting count coincides with the maximum count "4" (from the YES route of step S4 to step S5).

The DS3 subframe synchronism detecting unit 2 repetitively performs such comparison processing as described above (from the NO route of step S5 to step S3) until the maximum count "4" is reached (until the discrimination in step S5 changes to YES). On the other hand, if the count of the counter 2-4 coincides with the maximum count "4", then the DS3 subframe synchronism detecting unit 2 determines that synchronism of DS3 subframes has been established (from the YES route of step S5 to step S6).

On the other hand, if a signal indicating that coincidence of the synchronizing pattern of DS3 subframes is detected from within the received signal is received from the DS3 subframe synchronism detecting unit 2, then the DS3 multiframe synchronism detecting unit 3 starts synchronism detection of DS3 multiframes (from the YES route of step S2 to step S7).

Here, in the DS3 multiframe synchronism detecting unit 3, the pattern detecting unit 3-1 (refer to FIG. 2) detects a frame pattern of DS3 multiframes (a second detecting step), and the pattern check unit 3-2 determines whether or not bits corresponding to "M1", "M2", "M3" in the frame pattern detected by the pattern detecting unit 3-1 coincide with the synchronizing pattern ("M1"="0", "M2"="1", "M3"="0") (step S8). Here, if the frame pattern detected by the pattern detecting unit 3-1 does not coincide with the synchronizing pattern, then the pattern detecting unit 3-1 repetitively performs detection of a frame pattern of DS3 multiframes (from the NO route of step S8 to step S7) until coincidence with the synchronizing pattern is detected (until the discrimination in step S8 changes to YES).

If the pattern check unit 3-2 discriminates that the frame pattern detected by the pattern detecting unit 3-1 coincides with the synchronizing pattern of DS3 multiframes, then it outputs to the comparison processing unit 3-3 a signal indicating that coincidence with the synchronizing pattern of DS3 multiframes has been detected from the received data, and the comparison processing unit 3-3 starts its comparison processing (from the YES route of step S8 to step S9).

If the frame pattern detected by the pattern detecting unit 3-1 coincides with the synchronizing pattern, a write control unit 3-3a of the comparison processing unit 3-3 writes the bit positions detected by the pattern detecting unit 3-1 into the memory 3-5.

The comparing unit 3-3b starts comparison based on the bit positions stored in the memory 3-5 and the received data (step S9) and determines whether or not the detected frame pattern coincides with the synchronizing pattern again based on the bit positions stored in the memory 3-5 (step S10).

The comparing unit 3-3b outputs, if a result of the comparison proves that the frame pattern does not coincide with the synchronizing pattern, a signal indicating this to the compulsory synchronism detection retrying control unit 5.

The protection counter 5-1 of the compulsory synchronism detection retrying control unit 5 (refer to FIG. 1) starts counting up of its count "CTR1" in response to reception of the signal indicating that the frame pattern does not coincide with the synchronizing pattern of DS3 multiframes (from the NO route of step S10 to step S14) and then determines whether or not the count "CTR1" reaches the maximum count "16". If the count "CTR1" is A"16" (if the discrimination in step S15 is YES) after a predetermined time passes, the compulsory synchronism detection retrying control unit 5 performs compulsory synchronism detection retrying control so that the synchronizing pattern detection may be compulsorily retried beginning with the DS3 subframe synchronism detecting unit 2 (from step S33, to steps S1 and S7: compulsory synchronism detection retrying step). The protection counter 5-1 performs pattern comparison if the count "CTR1" does not reach "16" (from the NO route of step S15 to step S9).

On the other hand, if the frame pattern detected using the bit positions stored in the memory 3-5 coincides with the synchronizing pattern, then the DS3 multiframe synchronism detecting unit 3 increments the count of the counter 3-4, and clears the count "CTR1" of the protection counter 5-1 (from the YES route of step S10 to step S11). Then, the DS3 multiframe synchronism detecting unit 3 determines whether or not the count of the counter 3-4 coincides with the maximum count "2" (step S12).

Here, the DS3 multi frame synchronism detecting unit 3 repetitively performs the comparison processing (from the NO route of step S12 to step S9) until the count of the counter 3-4 reaches the maximum count "2" (until the determination in step S12 changes to YES). Then, when the count of the counter 3-4 reaches the maximum count "2", then the DS3 multiframe synchronism detecting unit 3 determines that the synchronism of DS3 multiframes has been established (from the YES route of step S12 to step S13).

Meanwhile, when the signal indicating that coincidence with the synchronizing pattern of DS3 subframes is detected from data is received from the DS3 subframe synchronism detecting unit 2, the PLCP frame synchronism detecting unit 4 starts detection of synchronism of a PLCP frame (from the YES route of step S2 to step S16).

Here, in the PLCP frame synchronism detecting unit 4, the pattern detecting unit 40-1 (refer to FIG. 2) detects a frame pattern of PLCP frames (step S16: third detecting step), and the pattern check unit 40-2 determines whether or not bytes corresponding to the "A1" and "A2" in the frame pattern detected by the pattern detecting unit 40-1 coincide with the synchronizing pattern ["A1"="F6" (hex), "A2"="28" (hex)] (step S17).

If the frame pattern detected by the pattern detecting unit 40-1 does not coincide with the synchronizing pattern, then the pattern detecting unit 40-1 repetitively detects a frame pattern of PLCP frames (from the NO route of step S17 to step S16) until coincidence with the synchronizing pattern is detected (until the determination in step S17 changes to YES).

Figure 5:
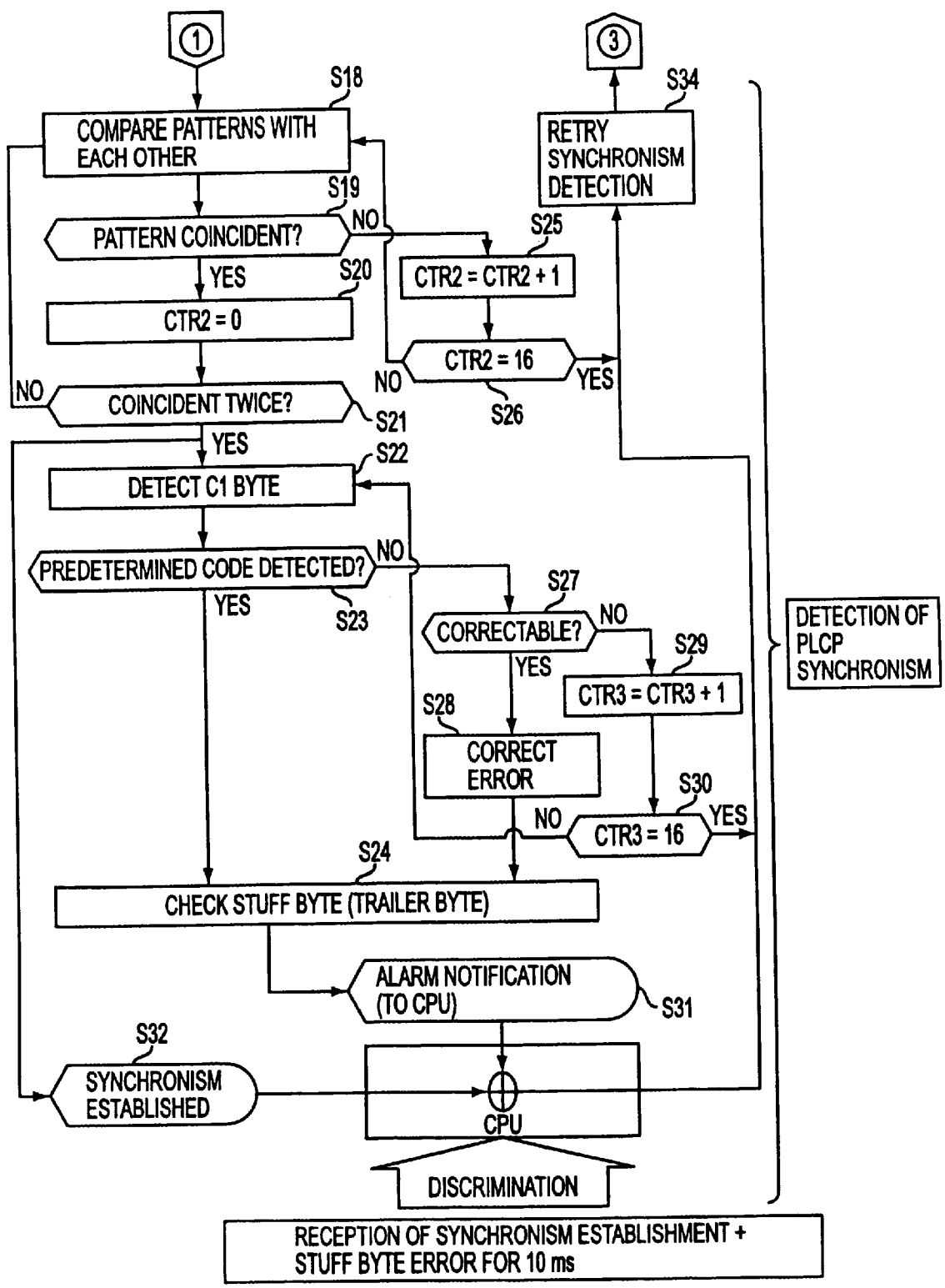

If it is detected that the detected frame pattern coincides with the synchronizing pattern of PLCP frames, then the pattern check unit 40-2 outputs to the 40-3 a signal indicating that coincidence with the synchronizing pattern of DS3 multiframes has been detected, and the comparison processing unit 40-3 starts its comparison processing (from the YES route of step S17 to step S18 of FIG. 5).

It is to be noted that, upon the pattern comparison processing, when the bits detected by the pattern detecting unit 40-1 coincide with the synchronizing pattern, the write control section 40-3a writes the bit positions detected by the pattern detecting unit 40-1 into the memory 40-5.

Then, the comparing unit 40-3b performs pattern comparison between the bit positions stored in the memory 40-5 and the received data (step S18) and determines by comparison whether or not bits detected based on the bit positions stored in the memory 40-5 coincide with the synchronizing pattern again (step S19).

Here, if a result of the comparison by the comparing unit 40-3b proves that the bits do not coincide with the synchronizing pattern, then the pattern detecting unit 40-1 outputs to the compulsory synchronism detection retrying control unit 5 a signal indicating that it is failed to detect coincidence on the synchronizing pattern. On the other hand, in the compulsory synchronism detection retrying control unit 5 (refer to FIG. 1), the protection counter 5-2 starts counting up of its count "CTR2" in response to reception of the signal indicating that the bits do not coincide with the synchronizing pattern ["A1"="F6" (hex), "A2"="28" (hex)] of a PLCP frame (from the NO route of step S19 to step S25) and then determines whether or not the count "CRT2" reaches the maximum count "16" (step S26). Then, if the count "CTR2" reaches "16" (when the determination in step S26 is YES), then the compulsory synchronism detection retrying control unit 5 performs compulsory synchronism detection retrying control beginning with the DS3 subframe synchronism detecting unit 2 so that the synchronizing pattern may be compulsorily detected again (from step S34 of FIG. 5 to steps S1 and S7 of FIG. 4: compulsory synchronism detection retrying step).

If the count "CTR2" does not reach the maximum count "16", the protection counter 5-2 performs pattern comparison (from the NO route of step S26 to step S19).

On the other hand, if the frame pattern detected using the bit positions stored in the memory 40-5 coincides with the synchronizing pattern, then the PLCP frame synchronism detecting unit 4 performs counting up of the count of the counter 40-4 and clears the count "CTR2" of the protection counter 5-2 (from the YES route of step S19 to step S20), and then determines whether or not the count of the counter 40-4 coincides with the maximum count "2" (step S21).

Here, in the PLCP frame synchronism detecting unit 4 (refer to FIG. 3), the frame counter 4-11 not only performs synchronism detection processing, but also receives a result of an increment check by the POI check unit 4-4 or the POL discriminating unit 4-5 through the frame pattern check unit 4-6 and determines whether or not the synchronism of a PLCP frame has been established. Upon this determination, it is required that coincidence on the synchronizing pattern is determined twice.

Then, the PLCP frame synchronism detecting unit 4 repetitively performs the comparison processing (from the NO route of step S21 to step S18) until the count of the counter 40-4 reaches the maximum count "2" (until the discrimination in step S21 changes to YES). Then, when the maximum count "2" is reached, the PLCP frame synchronism detecting unit 4 determines that the synchronism of PLCP frames has been established (from the YES route of step S21 to step S32).

After the synchronism of PLCP frames is established in this manner, the C1 detecting unit 4-7 performs detection of the "C1" bytes from the received data (from the YES route of step S21 to step S22), and the error correcting unit 4-8 determines whether or not the detected "C1" bytes are the predetermined code (step S23). More particularly, the error correcting unit 4-8 supervises the length of the trailer 18 of a PLCP frame which varies periodically. If the detected "C1" bytes are the predetermined code, then the trailer detecting unit 4-9 detects the trailer 18 based on the predetermined code of the "C1" bytes received from the error correcting unit 4-8, and the trailer discriminating unit 4-10 determines whether or not the.data in the detected trailer 18 have the "1100" bit structure in units of one nibble (from the YES route of step S23 to step S24). If the data in the detected trailer 18 do not have the "1100" bit structure in units of one nibble, then the trailer discriminating unit 4-10 informs the CPU of an alarm (step S31).

On the other hand, if the data in the "C1" bytes detected by the C1 detecting unit 4-7 are not arranged to have the predetermined code structure, then the error correcting unit 4-8 determines whether or not the error is correctable (from the NO route of step S23 to step S27).

Here, if the error is correctable, then the error correcting unit 4-8 corrects the error in the "C1" bytes (from the YES route of step S27 to step S28). Thereafter, the trailer detecting unit 4-9 detects the trailer 18 based on the "C1" bytes after corrected in a similar manner as described above, and the trailer discriminating unit 4-10 performs discrimination of the trailer 18 (step S24).

On the other hand, if the code in the detected "C1" byte is not correctable, then the error correcting unit 4-8 in the PLCP frame synchronism detecting unit 4 outputs a signal indicating this to the frame counter 4-11. The frame counter 4-11 starts counting up of the count "CTR3" thereof in response to reception of the signal indicating that the error is not correctable (from the NO route of step S27 to step S29), and determines whether or not the count "CTR3" is "16" (step S30). If the count "CTR3" is "16" (when the determination in step S30 is YES), then compulsory synchronism detection retrying control is effected on the DS3 subframe synchronism detecting unit 2 to be brought into the synchronism detection retrying mode (from step S34 to steps S1 and S7 of FIG. 4).

It is to be noted that, if a signal indicating that the synchronism of DS3 subframes has been detected is received again from the DS3 subframe synchronism detecting unit 2 (from the YES route of step S2 to step S16), then the PLCP frame synchronism detecting unit 4 performs synchronism detection of a PLCP frame again. On the other hand, if the count "CTR3" does not coincide with "16", then the frame counter 4-11 causes the C1 detecting unit 4-7 to detect the "C1" bytes (from the NO route of step S30 to step S22).

In this manner, according to the frame synchronism processing apparatus 1 of the first embodiment of the present invention, for example, if false synchronism state is brought about on the synchronism of DS3 subframes due to the generation of the ATM cells such as AIS with the result that the synchronism of DS3 multiframes or a PLCP frame is failed to be established, the compulsory synchronism detection retrying control unit 5 brings the DS3 subframe synchronism detecting unit 2 synchronism detection retrying mode. Consequently, it is possible to avoid a deadlock arising from a failure in detecting synchronism of DS3 multiframes or a PLCP frame caused by false synchronism and to improve the reliability in synchronism establishing processing.

Further, according to the above frame synchronism processing apparatus 1, it is possible to cope with a bit error or false synchronism if the DS3 frames or the PLCP frame has a frame synchronizing pattern with a small bit number.

Furthermore, since the PLCP frame synchronism detecting unit 4 establishes synchronism taking the length of the trailer 18 of a PLCP frame, which varies periodically, into consideration and taking a frame pattern into consideration and, also after synchronism is established, the trailer 18 is supervised to perform a check and so forth of the frame pattern, a countermeasure against false synchronism caused by a bit error or bit displacement can be taken readily and the reliability in synchronism establishing processing can be improved.

b. Second Embodiment

A second preferred embodiment of the present invention will hereinafter be decribed below. In the second embodiment, like reference symbols to those of the first embodiment are used to denote like elements to those described hereinabove.

Figure 6:
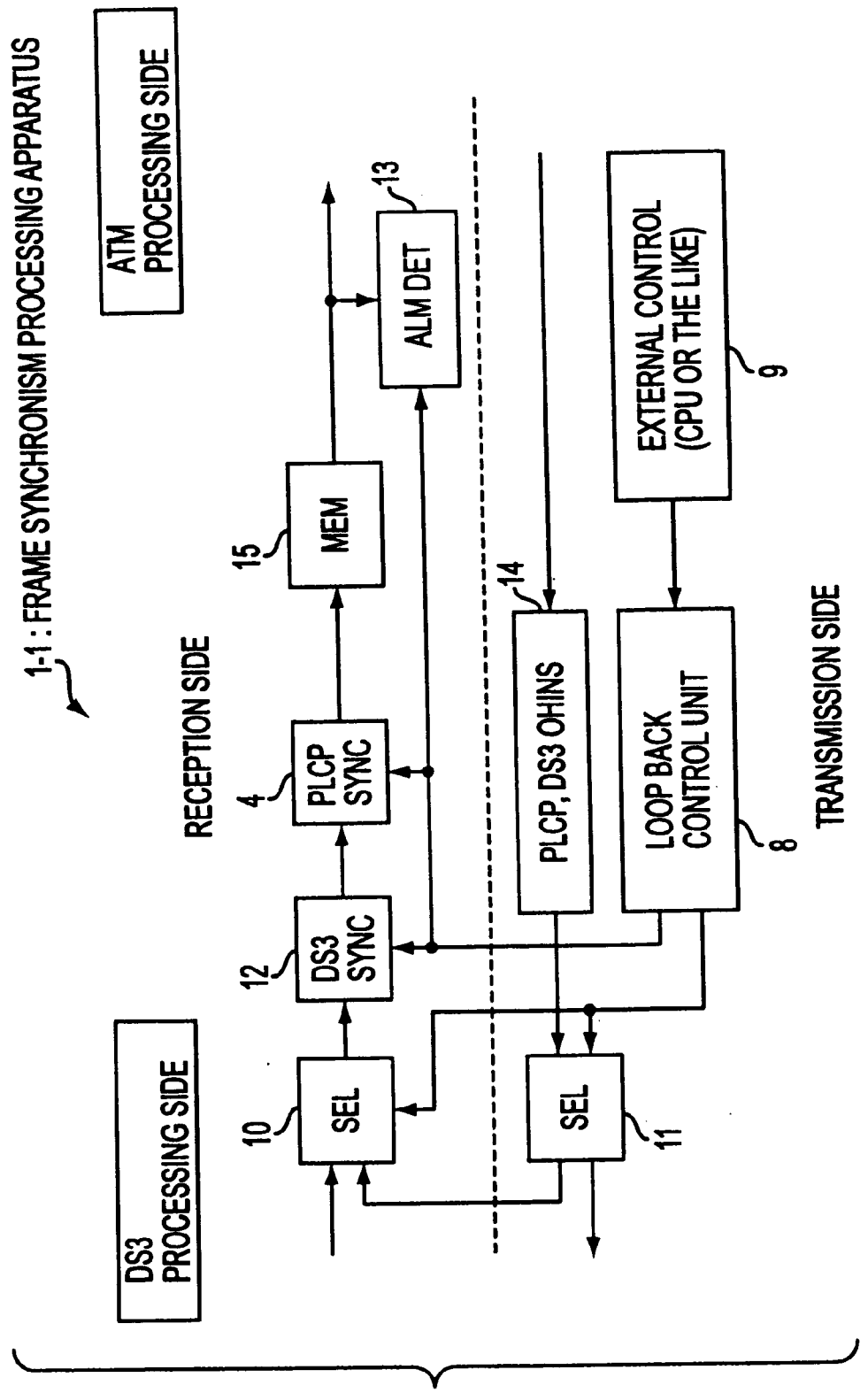
FIG. 6 is a block diagram showing a construction of a frame synchronism processing apparatus according to a second embodiment of the present invention.

FIG. 6 shows a construction of the frame synchronism processing apparatus according to the second embodiment of the present invention. Referring to FIG. 6, the frame synchronism processing apparatus generally denoted at 1-1 is a modification to but is different from the frame synchronism processing apparatus 1 of the first embodiment described hereinabove in that a signal to the DS3 processing side is sent back to the ATM processing side. It is to be noted that the present frame synchronism processing apparatus 1-1 includes a reception side which performs extraction of an ATM cell from within a DS3 signal received from the DS3 processing side and transmitting the extracted ATM cell to the ATM processing side, and a transmission side which transmits a DS3 signal obtained by mapping an ATM cell received from the ATM processing side in a PLCP frame and DS3 frames to the DS3 processing side.

To this end, the frame synchronism processing apparatus 1-1 includes, on the reception side, a PLCP frame synchronism detecting unit (PLCP Sync) 4, a DS3 synchronism detecting unit (DS3 Sync) 12, an alarm detecting unit 13, a memory (MEM) 15 and a selector (SEL) 10, and includes, on the transmission side, a loop back control unit 8, an external control unit 9, an insertion unit 14 and a selector (SEL) 11.

The DS3 synchronism detecting unit 12 includes a DS3 subframe synchronism detecting unit (first detecting unit) 2 and a DS3 multiframe synchronism detecting unit (second detecting unit) 3 described hereinabove. Also in this instance, the DS3 multiframe synchronism detecting unit 3 detects synchronism of a DS3 multiframe when it receives from the DS3 subframe synchronism detecting unit 2 a signal indicating that synchronism of DS3 subframes has been detected. It is to be noted that, though not shown in FIG. 6, the DS3 subframe synchronism detecting unit 2, DS3 multiframe synchronism detecting unit 3 and PLCP frame synchronism detecting unit 4 are constructed such that they can perform synchronism detection retrying processing by compulsory control by the compulsory synchronism detection retrying control unit 5 described hereinabove with reference to FIG. 1.

The memory (storage unit) 15 stores data outputted from the PLCP frame synchronism detecting unit 4. In particular, the memory 15 stores data outputted from the PLCP frame synchronism detecting unit 4 after establishment of synchronism into a predetermined address.

The alarm detecting unit 13 supervises a main signal outputted from the memory 15 and performs a check of an alarm (alarm processing) and so forth. In particular, the alarm detecting unit 13 performs a check of an alarm and so forth based on a signal after synchronism detection processing by the DS3 synchronism detecting unit 12 and the PLCP frame synchronism detecting unit 4.

The alarm detecting unit 13 inhibits alarm processing under the control of the loop back control unit 8 while the DS3 synchronism detecting unit 12 and the PLCP frame synchronism detecting unit 4 are controlled to a synchronism detection retrying mode. Further, the alarm detecting unit 13 inhibits alarm processing also while the DS3 synchronism detecting unit 12 and the PLCP frame synchronism detecting unit 4 are controlled to a synchronism detection retrying mode by the compulsory synchronism detection retrying control unit 5.

The memory 15 and the alarm detecting unit 13 described above cooperatively function as an alarm processing unit which detects an alarm state of a signal after synchronism detection processing by the DS3 synchronism detecting unit 12 and the PLCP frame synchronism detecting unit 4 and performs desired alarm processing.

The inserting unit 14 maps an ATM cell received from the ATM processing side in a PLCP frame (refer to FIG. 11), and inserts the PLCP frame into DS3 subframes (refer to FIG. 9) and outputs a resulting signal to the DS3 processing side.

The external control unit 9 performs loop back setting. The loop back control unit 8 controls pertaining components so that desired loop back processing may be performed under the control of the external control unit 9. In particular, the loop back control unit 8 produces control signals for loop back control and sends out the loop back control signals to the pertaining components.

Here, the loop back control unit 8 compulsorily controls the DS3 synchronism detecting unit 12 and the PLCP frame synchronism detecting unit 4 to a synchronism detection retrying mode when a transmission signal outputted from the inserting unit 14 is to be sent back to the reception side, and performs control to inhibit the alarm detecting unit 13 from performing alarm processing while the DS3 synchronism detecting unit 12 and the PLCP frame synchronism detecting unit 4 are controlled to synchronism detection retrying mode.

Further, when an ATM cell is mapped in DS3 frames received from the DS3 processing side, the loop back control unit 8 controls the selectors 10 and 11 so that a transmission signal is sent back from the transmission side after writing of the ATM cell into the memory 15 is completed.

Each of the selectors 10 and 11 switches an output destination of a received signal under the control of the loop back control unit 8.

In the frame synchronism processing apparatus 1-1 according to the second embodiment having the construction described above, when a DS3 signal is to be sent back from the transmission side to the reception side, after one ATM cell is written into the memory 15 without interruption on the reception side, the selectors 10 and 11 are controlled by the loop back control unit 8 so that a transmission signal outputted from the inserting unit 14 of the transmission side is outputted to the DS3 synchronism detecting unit 12.

On the other hand, when a transmission signal from the transmission side is to be outputted from the selector 10, the loop back control unit 8 compulsorily controls the DS3 synchronism detecting unit 12 and the PLCP frame synchronism detecting unit 4 to a synchronism detection retrying mode and controls to inhibit the alarm detecting unit 13 from performing alarm processing.

If synchronism is detected by the DS3 synchronism detecting unit 12 and the PLCP frame synchronism detecting unit 4, then a signal outputted from the PLCP frame synchronism detecting unit 4 is written into the memory 15. Further, after the synchronism of DS3 subframes, a DS3 multiframe and a PLCP frame is established, the alarm detecting unit 13 performs alarm processing.

Figure 7:
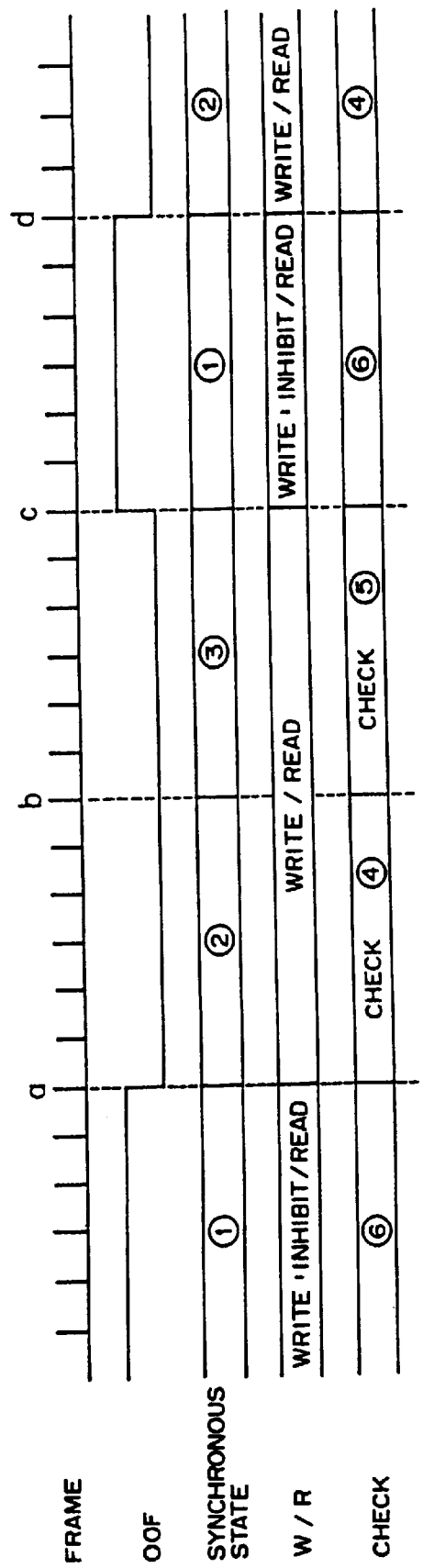
FIG. 7 is a time chart illustrating alarm processing of an alarm detecting unit of the frame synchronism processing apparatus.

FIG. 7 is a time chart illustrating the alarm processing of the alarm detecting unit 13. Referring to FIG. 7, prior to the a-th frame, for example, frame synchronism is not established (OOF; Out Of Frame) as upon startup of the apparatus, and writing into the memory 15 is inhibited and a signal stored in the memory 15 is read out. Meanwhile, the alarm detecting unit 13 does not perform an alarm check (alarm processing) of the signal read out from the memory 15. Then, prior to the c-th frame after the a-th frame, synchronism is established (the OOF is cancelled), and a signal is written into and read out from the memory 15. Further, the alarm detecting unit 13 performs an alarm check of the signal read out from the memory 15. It is to be noted that, if an alarm is detected, then the ATM cell is abandoned.

Here, prior to the c-th frame from the b-th frame in FIG. 7, although the apparatus is in a condition wherein frame synchronism is established, it is in a forward protection condition (incoincidence of a frame pattern), and although writing and reading out of a signal into and from the memory 15 are performed, the alarm detecting unit 13 performs an alarm check. Then, if an alarm is detected, then the alarm detecting unit 13 delivers a notification of an alarm to the outside together with a flag representing forward protection. It is to be noted that, in this instance, the ATM cell is not abandoned, but processing for the ATM cell is performed.

Thereafter, in an out of synchronism (frame) condition within a period from the c-th frame to the d-th frame, no signal is written into the memory 15, and the alarm detecting unit 13 does not perform an alarm check.

In this manner, with the frame synchronism processing apparatus 1-1 according to the second embodiment, similar effects to those of the frame synchronism processing apparatus 1 described hereinabove can be achieved, and besides, when a signal is to be sent back from the transmission side to the reception side, the DS3 synchronism detecting unit 12 and the PLCP frame synchronism detecting unit 4 are compulsorily controlled to a synchronism detection retrying mode.

Here, if the selectors 10 and 11 on the DS3 termination side are switched immediately based on information controlled by setting of the CPU or an external pin or pins or the like, then clock distortion occurs, and a situation wherein the reliability in a result of a check of an alarm is damaged significantly may possibly occur.

According to the frame synchronism processing apparatus 1-1 of the present embodiment, however, since also a signal to be sent back to the DS3 synchronism detecting unit 12 and the PLCP frame synchronism detecting unit 4 is compulsorily controlled to a synchronism detection retrying mode and the alarm detecting unit 13 is controlled so as not to perform an alarm check while the DS3 synchronism detecting unit 12 and the PLCP frame synchronism detecting unit 4 are in a synchronism detection condition, alarm processing of a high degree of reliability can be performed and a higher circuit quality can be realized.

Figure 14:
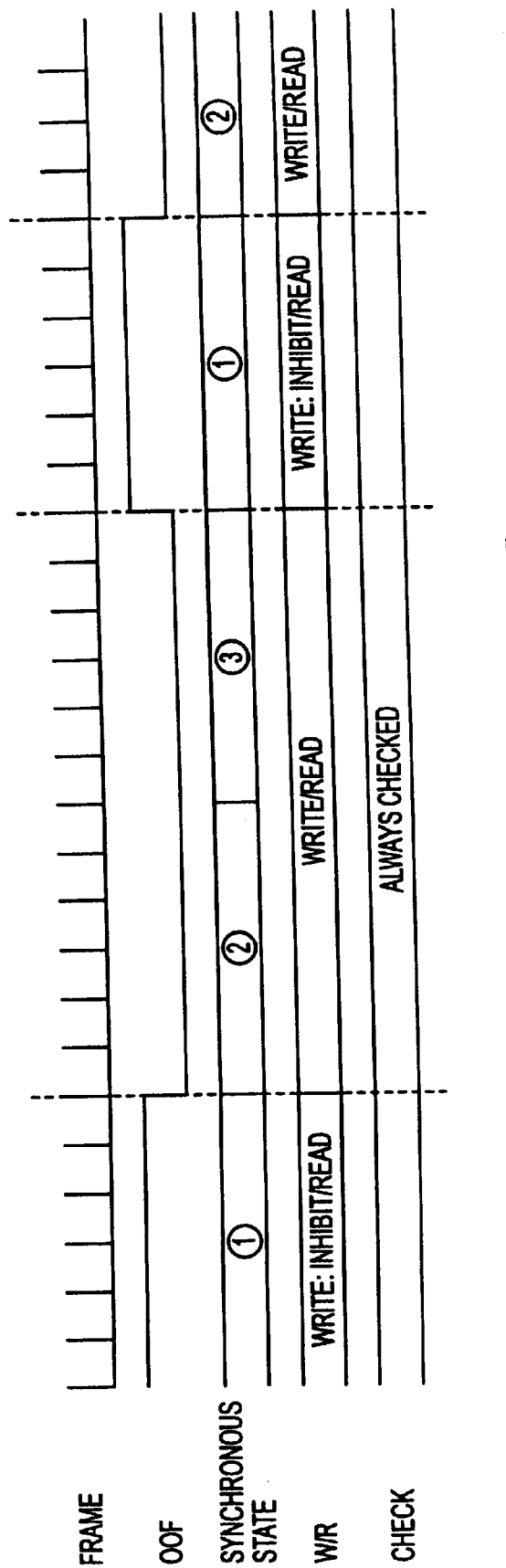
FIG. 14 is a time chart illustrating alarm processing.

Further, since the alarm detecting unit 13, unlike the alarm detection described hereinabove with reference to FIG. 14, performs alarm processing based on a signal after establishment of the synchronism by the DS3 synchronism detecting unit 12 and the PLCP frame synchronism detecting unit 4 and the loop back control unit 8 inhibits alarm processing by the alarm detecting unit 13 while the DS3 synchronism detecting unit 12 and the PLCP frame synchronism detecting unit 4 are in a synchronism detection retrying mode, a higher circuit quality can be realized.

Furthermore, with the frame synchronism processing apparatus 1-1 according to the present embodiment, since the loop back control unit 8 sends back an ATM cell of a received signal after the ATM cell is written into the memory 15, a damaged ATM cell can be prevented from being transmitted, and a higher circuit quality can be maintained.

c. Third Embodiment

In the frame synchronism processing apparatus of the embodiments described above, it is presumed that, where a PLCP frame is stored in DS3 frames, synchronism of DS3 subframes and a DS3 multiframe is detected, and synchronism of PLCP frames is established. However, where some other signal frame is mapped, it can be imagined that synchronism of such other signal is detected, and even when synchronism of such other frame cannot be detected, a condition may be brought about wherein synchronism is detected from DS3 subframes again.

Further, in place of a signal of DS3 frames, some other signal frame can be imagined. The following is a description of a case wherein a plurality of subframes are hierarchically arranged by nesting in a signal frame in such an instance as just described.

Figure 8:
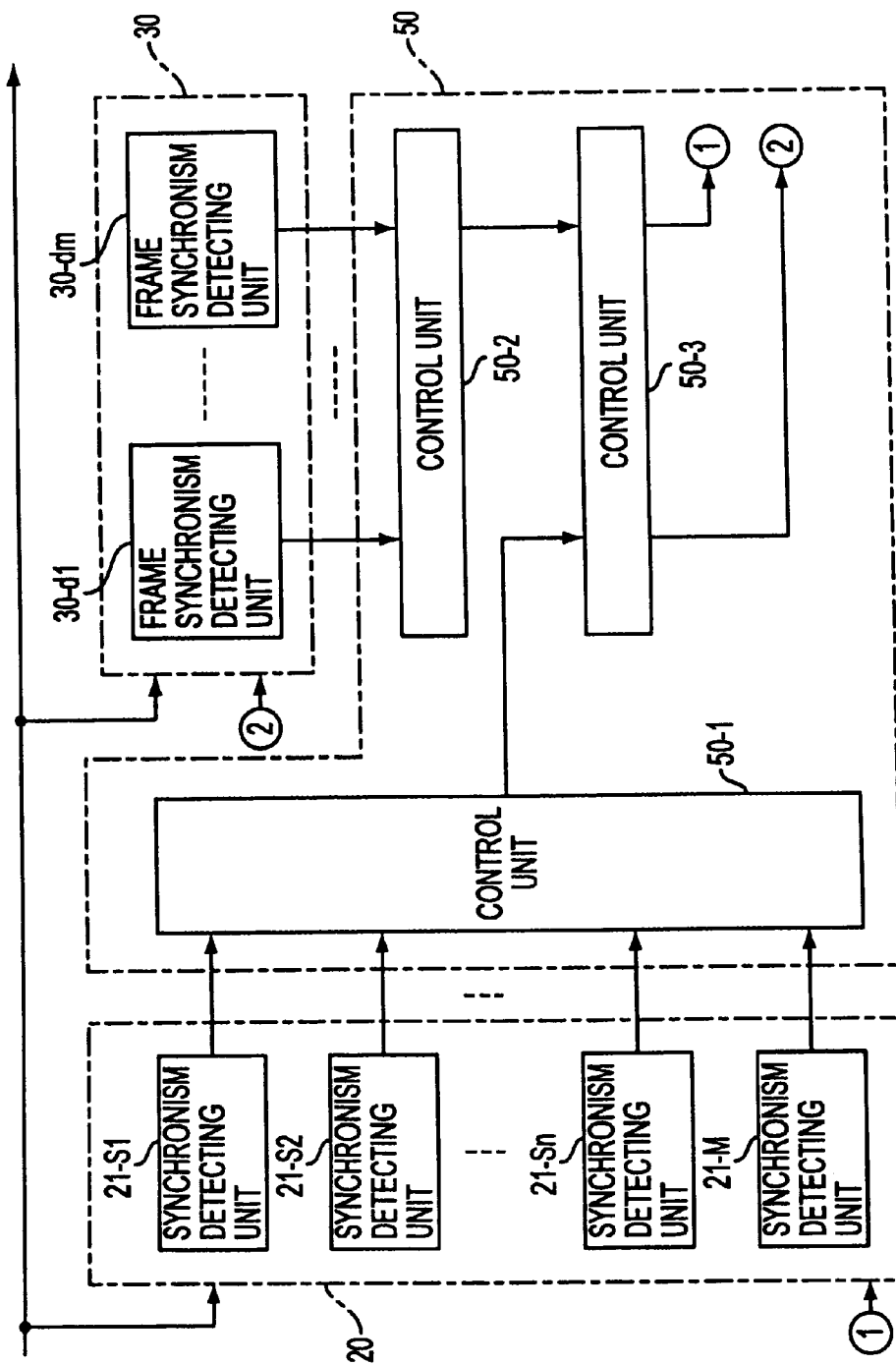
FIG. 8 is a block diagram showing a construction of a frame synchronism processing apparatus according to a third embodiment of the present invention.

FIG. 8 shows a construction of a frame synchronism processing apparatus according to a third preferred embodiment of the present invention. Referring to FIG. 8, the frame synchronism processing apparatus generally denoted at 1-2 detects, where a plurality of subframes (S) (unit frames) are mapped in a transmission frame (M) and some other frames [(d1), (d2), . . . , (dm[m is an integer])] (unit frames) are nested in the subframes (S), synchronism of the subframes (S), frames [(d1), (d2), . . . , (dm)] and transmission frame (M), and when synchronism of any one of the transmission frame (M) and the frames [(d1), (d2), . . . ,(dm)] cannot be detected, the frame synchronism processing apparatus 1-2 compulsorily detects synchronism of all of the frames again.

It is to be noted that the subframes (S) are mapped in the transmission frame (M), and the frames (d1) to (dm) are mapped in the subframes (S). The subframes (S), frames (d1) to (dm) and transmission frame (M) are formed in different frame formats. Also in the following description, the subframes, transmission frame and frames are described below with identification symbols in parentheses added thereto for the convenience of description.

To the end described above, the frame synchronism processing apparatus 1-2 includes a synchronizing block 20, another synchronizing block 30 and a control block 50 as seen from FIG. 8.

The synchronizing block 20 detects synchronism of the subframes (S) mapped in the transmission frame (M) and detects synchronism of the transmission frame (M). To this end, the synchronizing block 20 includes, as shown in FIG. 8, synchronism detecting units (frame synchronism detecting units) 21-S1 to 21-Sn (n is an integer equal to or greater than 2) and a synchronism detecting unit (frame synchronism detecting unit) 21-M.

The synchronism detecting units 21-S1 to 21-Sn detect synchronism of the subframes (S). For example, the synchronism detecting unit 21-S1 starts detection of synchronism of a subframe (S) at the beginning, and if synchronism is detected by the synchronism detecting unit 21-S1, then the synchronism detecting unit 21-S2 starts processing for synchronism detection. Similarly, also the other synchronism detecting units 21-S3 to 21-Sn successively detect synchronism of the subframes (S).

The synchronism detecting unit 21-M detects synchronism of the transmission frame (M). For example, if synchronism of the subframes (S) is detected by the synchronism detecting unit 21-S1, then the synchronism detecting unit 21-M detects synchronism of the transmission frame (M), and synchronism of the transmission frame (M) depends upon synchronism of the subframe (S).

Further, each of the synchronism detecting units 21-S1 to 21-Sn and 21-M outputs, if it detects the synchronism, a signal indicative of the detection to the control block 50. Further, each of the synchronism detecting units 21-S1 to 21-Sn and 21-M performs compulsory synchronism detecting under the compulsory synchronism detection retrying control from the control block 50.

The synchronizing block 30 detects synchronism of the frames (d1) to (dm) which are in the hierarchy lower subframes (S) and includes synchronism detecting units (frame synchronism detecting units) 30-d1 to 30-dm as shown in FIG. 8.

The synchronism detecting units 30-d1 to 30-dm detect synchronism of the frames (d1) to (dm), respectively. For example, the synchronism detecting units 30-d1 to 30-dm detect synchronism of the frames (d1) to (dm), respectively, after synchronism of the subframes (S) is detected. The synchronism of the frames (d1) to (dm) depends upon the synchronism of the subframes (S).

Further, if each of the synchronism detecting units 30-d1 to 30-dm outputs and detects synchronism, information indicative of the detection to the control block 50, and further performs compulsory synchronism detection again under the control of the control block 50.

The control block (compulsory synchronism detection retrying control unit) 50 collectively manages the blocks based on synchronism detection conditions by the synchronizing blocks 20 and 30 to compulsorily control the synchronizing blocks 20 and 30 under predetermined conditions. For example, if synchronism cannot be, detected by any one of the plurality of the synchronism detecting units 21-S1 to 21-Sn, 21-M and 30-d1 to 30-dm, the control block 50 compulsorily controls all of the synchronism detecting units 21-S1 to 21-Sn, 21-M and 30-d1 to 30-dm to perform synchronism detection processing by them again.

To this end, the control block 50 includes control units 50-1, 50-2 and 50-3 as shown in FIG. 8.

The control unit 50-1 outputs, based on information received from the synchronizing block 20, to the control unit 50-3 a signal indicating that synchronism of the transmission frame (M) and the subframes (S) is established by the synchronizing block 20. In particular, the control unit 50-1 receives signals from the synchronism detecting units 21-S1 to 21-Sn and 21-M and outputs a signal to the control unit 50-3.

For example, the control unit 50-1 outputs a signal indicating that synchronism is detected by each of the synchronism detecting units 21-S1 to 21-Sn and 21-M or a signal indicating that synchronism of the subframes (S) is established but synchronism of the transmission frame is not established, to the control unit 50-3.

The control unit 50-2 outputs, based on a signal received from the synchronizing block 30, to the control unit 50-3 a signal indicating that synchronism of the frames (d1) to (dm) is established by the synchronizing block 30. In particular, the control unit 50-2 outputs a signal to the control unit 50-3 based on signals received from the synchronism detecting units 30-d1 to 30-dm.

For example, the control unit 50-2 outputs a signal indicating that synchronism is detected by each of the synchronism detecting units 30-d1 to 30-dm or a signal indicating that synchronism is not detected by some of the synchronism detecting units 30-d1 to 30-dm to the control unit 50-3. Further, each of the synchronism detecting units 30-d1 to 30-dm outputs, when bit displacement is detected after synchronism of each frame is established, information indicative of the detection to the control unit 50-3.

The control unit 50-3 synthetically analyzes signals received from the control unit 50-1 and the control unit 50-2 and compulsorily controls the synchronizing blocks 20 and 30.

For example, when synchronism of the subframes (S) is established by the synchronizing block 20, if a signal indicating that synchronism of the transmission frame (M) cannot be detected is received from the control unit 50-1, then the control unit 50-3 compulsorily controls the synchronizing block 20 and the synchronizing block 30 to detect synchronism after elapse of a predetermined time. Further, also when a signal indicating that synchronism cannot be detected by some of the synchronism detecting units 30-d1 to 30-dm in the synchronizing block 30 is received from the control unit 50-2, the control unit 50-3 compulsorily controls the synchronizing block 20 and the synchronizing block 30 to a synchronism detection retrying mode.

According to the above arrangement of the frame synchronism processing apparatus 1-2 of the third embodiment of the present invention, when synchronism is to be established, the synchronism detecting units 21-S1 to 21-Sn, 21-M and 30-d1 to 30-dm detect synchronism of unit frames for each hierarchy (frame synchronism detecting step). First, the synchronism detecting unit 21-S1 starts detection of synchronism of a subframe (S). If synchronism is detected by the synchronism detecting unit 21-S1, then the other synchronism detecting units 21-S2 to Sn, 21-M and 30-d1 to 30-dm perform detection of synchronism. Each of the synchronism detecting units 21-S1 to 21-Sn, 21-M and 30-d1 to 30-dm outputs to the control block 50 a signal indicating that synchronism has been detected or some other signal.

The control block 50 determines, based on signals from the synchronizing blocks 20 and 30, how the synchronizing blocks 20 and 30 goes. For example, if synchronism cannot be established by the synchronizing block 30 after elapse of a predetermined time after synchronism is established by the synchronizing block 20, the control block 50 compulsorily controls the synchronizing block 20 and the synchronizing block 30 to detect synchronism (compulsory synchronism detection retrying step). Also when the synchronism detecting unit 21-M fails to detect synchronism after elapse of a predetermined time after the synchronism of the synchronism detecting units 21-S1 to 21-Sn in the synchronizing block 20 established synchronism, the control block 50 controls the synchronizing block 20 and the synchronizing block 30 to detect synchronism again (compulsory synchronism detection retrying step).

Further, if information of bit displacement is received, for example, from one of the synchronism detecting units 30-d1 or the like within the synchronizing block 30 such as the synchronism detecting units 30-d1 while synchronism of the transmission frame (M), subframes (S) and frames (d1) to (dm) is established, then the control block 50 controls all of the synchronism detecting units 21-S1 to 21-Sn, 21-M and 30-d1 to 30-dm to perform synchronism detection retrying processing.

In this manner, with the frame synchronism processing apparatus 1-2 according to the third embodiment of the present invention, if synchronism cannot be detected with any one of frames because an AIS or the like occurs upon detection of synchronism of the subframes (S) and false synchronism is brought about on the subframes (S) due to information in the AIS, the control block 50 compulsorily brings all of the synchronism detecting units 21-S1 to 21-Sn, 21-M and 30-d1 to 30-dm into synchronism detection processing. Therefore, it is possible to avoid a deadlock caused from a failure in synchronism detection due to false synchronism and improve the reliability in synchronism establishing processing.

d. Others

It is to be noted that the present invention is not limited to the embodiments described above, but can be embodied in various forms without departing from the scope and the spirit of the present invention.

What is claimed is:

1. A frame synchronism processing apparatus for receiving a multiframe signal including a plurality of subframes and detecting the synchronism of the subframes and the synchronism of the multiframe, said apparatus comprising:
   a first detecting unit for detecting the synchronism of the subframes;
   a second detecting unit for detecting the synchronism of the multiframe after said first detecting unit has detected the synchronism of the subframes; and
   a compulsory synchronism detection retrying control unit for compulsorily bringing each of said first and second detecting units into a synchronism detection retrying mode if said second detecting unit has failed to detect the synchronism of the multiframe with the lapse of a predetermined time after said first detecting unit had detected the synchronism of the subframes.

2. A frame synchronism processing apparatus according to claim 1, further comprising a third detecting unit for detecting the synchronism of a frame that is different from the subframes and the multiframe and is to be stored in the subframes, after said first detecting unit has detected the synchronism of the subframes, wherein said compulsory synchronism detection retrying control unit compulsorily brings each of said first, second and third detecting units into the synchronism detection retrying mode if said third detecting unit has failed to detect the synchronism of the different frame with the lapse of said predetermined time after said first detecting unit had detected the synchronism of the subframes.

3. A frame synchronism processing apparatus according to claim 1, wherein the multiframe is composed of a plurality of DS3 frames.

4. A frame synchronism processing apparatus according to claim 2, wherein the multiframe is composed of a plurality of DS3 frames, and said frame different from the subframes and the multiframe includes at least one PLCP frame.

5. A frame synchronism processing apparatus according to claim 4, wherein said third detecting unit has an error correcting unit for detecting an error in a stuff bit of the PLCP frame and correcting the detected error.

6. A frame synchronism processing apparatus according to claim 1, further comprising an alarm processing unit for performing a desired alarm process based on the multiframe signal as the result of after the synchronism detection, wherein while said compulsory synchronism detection retrying control unit compulsorily brings each of said first and second detecting units into the synchronism detection retrying mode, said compulsory synchronism detection retrying control unit inhibits said alarm processing unit from performing the alarm process.

7. A frame synchronism processing apparatus according to claim 6,
   wherein said alarm processing unit includes a holding unit for holding the resultant multiframe signal, and an alarm detecting unit for detecting alarm status of the muiltframe signal, based on the resultant multiframe signal held in said holding unit, and outputting alarm information, and
   wherein while said compulsory synchronism detection retrying control unit compulsorily brings said first and second detecting units into the synchronism detection retrying mode, said compulsory synchronism detection retrying control unit prohibits the resultant multiframe signal from being written into said holding unit and prevents said alarm detecting unit from outputting said alarm information.

8. A frame synchronism processing apparatus according to claim 2, further comprising an alarm processing unit for performing a desired alarm process based on the multiframe signal as the result of after the synchronism detection, wherein while said compulsory synchronism detection retrying control unit compulsorily brings each of said first and second detecting units into the synchronism detection retrying mode, said compulsory synchronism detection retrying control unit inhibits said alarm processing unit from performing the alarm process.

9. A frame synchronism processing apparatus according to claim 8,
   wherein said alarm processing unit includes a holding unit for holding the resultant multiframe signal, and an alarm detecting unit for detecting alarm status of the multiframe signal, based on the resultant multiframe signal held in said holding unit, and outputting alarm information, and
   wherein while said compulsory synchronism detection retrying control unit compulsorily brings said first and second detecting units into the synchronism detection retrying mode, said compulsory synchronism detection retrying control unit prohibits the resultant multiframe signal from being written into said holding unit and prevents said alarm detecting unit from outputting said alarm information.

10. A frame synchronism processing apparatus according to claim 1, further comprising an alarm processing unit for performing a desired alarm process based on the multiframe signal as the result of the synchronism detection, and a loop back controlling unit for sending a transmission signal back to the receiving side of transmission of the resultant multiframe signal, wherein while said loop back controlling unit sends the transmission signal back to the receiving side, said loop back controlling unit compulsorily brings each of said first and second detecting units into the synchronism detection retrying mode.

11. A frame synchronism processing apparatus according to claim 2, further comprising an alarm processing unit for performing a desired alarm process based on the multiframe signal as the result of the synchronism detection, and a loop back controlling unit for sending a transmission signal back to the receiving side of transmission of the resultant multiframe signal, wherein while said loop back controlling unit sends the transmission signal back to the receiving side, said loop back controlling unit compulsorily brings each of said first, second and third detecting units into the synchronism detection retrying mode.

12. A frame synchronism processing apparatus according to claim 10, wherein said alarm processing section includes a holding unit section for holding the multiframe signal, and an alarm detecting unit for detecting alarm status of the multiframe signal, based on the resultant multiframe signal held in said holding unit, and outputting alarm information, and wherein while said compulsory synchronism detection retrying control unit compulsorily brings each of said first, second and third detecting units into the synchronism detection retrying mode, said loop back controlling unit prohibits the resultant multiframe signal from being written into said holding unit and prevents said alarm detecting unit from outputting said alarm information.

13. A frame synchronism processing apparatus according to claim 11, wherein said alarm processing section includes a holding unit section for holding the multiframe signal, and an alarm detecting unit for detecting alarm status of the multiframe signal, based on the resultant multiframe signal held in said holding unit, and outputting alarm information, and wherein while said compulsory synchronism detection retrying control unit compulsorily brings each of said first, second and third detecting units into the synchronism detection retrying mode, said loop back controlling unit prohibits the resultant multiframe signal from being written into said holding unit and prevents said alarm detecting unit from outputting said alarm information.

14. A frame synchronism processing apparatus according to claim 12, wherein if the multiframe signal has an ATM cell stored therein, the loop back controlling unit completes the writing of one ATM cell into the holding unit and thereafter the signal send back is carried out.

15. A frame synchronism processing apparatus according to claim 13, wherein if the multiframe signal has an ATM cell stored therein, said loop back controlling unit sends the multiframe signal back to the receiving side after one ATM cell has been written into said holding unit.

16. A frame synchronism processing method for receiving a multiframe signal including a plurality of subframes and detecting the synchronism of the subframes and the synchronism of the multiframe, said method comprising the steps of:

(a) detecting the synchronism of the subframes;

(b) detecting the synchronism of the multiframe after said detecting of the synchronism of the subframes in said step (a); and (c) compulsorily retrying the synchronism detection on each of the frames from step (a) if said detecting of the synchronism of the multiframe has been failed in said step (b) with the lapse of a predetermined time after said detecting of the synchronism of the subframes in said step (a).

17. A frame synchronism processing method according to claim 16, further comprising an additional step of detecting the synchronism of a frame different from the subframes and the multiframe after said detecting of the synchronism of the subframes in said step (a), wherein if said detecting of the synchronism of the different frame has been failed in the additional step with the lapse of the predetermined time after said detecting of the synchronism of the subframes in said step (a), the synchronism detection on each of the frames from step (a) are retried in said step (c).

18. A frame synchronism processing apparatus comprising:

a plurality of frame synchronism detecting units each for receiving a transmission frame including a plurality of unit frames wherein the unit frames are hierarchically arranged by nesting one another and for detecting the synchronism of the unit frames at each of the hierarchies; and a compulsory synchronism detecting retrying control unit for compulsorily bringing each of said frame synchronism detecting units at each hierarchy into a synchronism detection retrying mode if the detection of the synchronism of the unit frames by any one of said frame synchronism detecting units at any hierarchy has failed.

19. A frame synchronism processing method comprising the steps of:

(a) receiving a transmission frame including a plurality of unit frames wherein the unit frames are hierarchically arranged by nesting one another and for detecting the synchronism of the unit frames at each of hierarchies; and (b) compulsorily performing a synchronism detection process for each of the unit frames at each hierarchy if the detection of the synchronism of the unit frames has failed at any hierarchy in said step (a).

* * * * *